(12) United States Patent
Morley, Jr. et al.

(10) Patent No.: US 7,478,751 B2
(45) Date of Patent: \*Jan. 20, 2009

(54) METHOD AND APPARATUS FOR AUTHENTICATING A MAGNETIC FINGERPRINT SIGNAL USING A FILTER CAPABLE OF ISOLATING A REMANENT NOISE RELATED SIGNAL COMPONENT

(75) Inventors: Robert E. Morley, Jr., St. Louis, MO (US); Robert S. Deland, Jr., Torrance, CA (US); Emmanuel C. Limtao, Bellflower, CA (US); Edward J. Richter, Richmond Heights, MO (US); Stephen R. Wood, San Pedro, CA (US)

(73) Assignees: Magtek, Inc., Carson, CA (US); Washington Univ., St. Louis, MO (US)

( \* ) Notice: Subject to any disclaimer, the term of this patent is extended or adjusted under 35 U.S.C. 154(b) by 76 days.

This patent is subject to a terminal disclaimer.

(21) Appl. No.: 11/014,930

(22) Filed: Dec. 17, 2004

(65) Prior Publication Data

US 2005/0167495 A1 Aug. 4, 2005

Related U.S. Application Data

(63) Continuation-in-part of application No. 10/997,150, filed on Nov. 24, 2004, now abandoned, which is a continuation of application No. 09/324,741, filed on Jun. 3, 1999, now Pat. No. 6,899,269, which is a continuation-in-part of application No. 09/120,816, filed on Jul. 22, 1998, now Pat. No. 6,098,881.

(51) Int. Cl.
*G06K 7/08* (2006.01)

(52) U.S. Cl. .................................. 235/449; 235/435
(58) Field of Classification Search ................ 235/449, 235/435; 341/126, 149, 155
See application file for complete search history.

(56) References Cited

U.S. PATENT DOCUMENTS 4,423,415 A 12/1983 Goldman (Continued)

OTHER PUBLICATIONS

International Search Report for International Application No. PCT/US2005/046387, filed Dec. 19, 2005, report completed Sep. 28, 2006 and mailed Oct. 20, 2006, 3 pgs.

(Continued)

*Primary Examiner*—Lisa M Caputo
(74) *Attorney, Agent, or Firm*—Christie, Parker & Hale, LLP.

(57) ABSTRACT

A system for verifying the authenticity of data contained in a magnetic medium using the remanent noise characteristics of the magnetic medium. In one embodiment, the invention includes a sensing unit configured to generate a signal indicative of the magnetic field of the magnetic medium, an analog-to-digital converter (ADC) in communication with the sensing unit and configured to digitize the analog signal, a filter in communication with the ADC configured to enhance the component of the signal associated with the remanent noise characteristic, a data extraction unit, in communication with the ADC and the filter configured to measure at least bit duration and peak location and an authentication extraction unit, in communication with the filter and the data extraction unit configured to extract a set of scaled samples from the output of the filter representative of the remanent noise characteristic.

20 Claims, 18 Drawing Sheets

U.S. PATENT DOCUMENTS

| | | |
|---|---|---|
| 4,476,468 A | 10/1984 | Goldman |
| 4,489,318 A | 12/1984 | Goldman |
| 4,546,352 A | 10/1985 | Goldman |
| 4,568,936 A | 2/1986 | Goldman |
| 4,630,845 A | 12/1986 | Sanner |
| 4,635,054 A | 1/1987 | Goldman |
| 4,650,978 A | 3/1987 | Hudson et al. |
| 4,689,477 A | 8/1987 | Goldman |
| 4,748,679 A | 5/1988 | Gold et al. |
| 4,752,837 A | 6/1988 | DeLand, Jr. |
| 4,785,290 A | 11/1988 | Goldman |
| 4,806,740 A | 2/1989 | Gold et al. |
| 4,807,287 A | 2/1989 | Tucker et al. |
| 4,837,426 A | 6/1989 | Pease et al. |
| 4,906,988 A | 3/1990 | Copella |
| 4,916,294 A | 4/1990 | Goldman |
| 4,985,614 A | 1/1991 | Pease et al. |
| 5,023,923 A | 6/1991 | Sanner et al. |
| 5,177,344 A | 1/1993 | Pease |
| 5,216,229 A | 6/1993 | Copella et al. |
| 5,235,166 A | 8/1993 | Fernadez |
| 5,254,843 A | 10/1993 | Hynes et al. |
| 5,365,586 A | 11/1994 | Indeck et al. |
| 5,396,369 A | 3/1995 | Deland, Jr. et al. |
| 5,408,505 A | 4/1995 | Indeck et al. |
| 5,428,683 A | 6/1995 | Indeck et al. |
| 5,430,279 A | 7/1995 | Fernadez |
| 5,434,917 A | 7/1995 | Naccache et al. |
| 5,546,462 A | 8/1996 | Indeck et al. |
| 5,587,654 A | 12/1996 | Indeck et al. |
| 5,602,381 A | 2/1997 | Hoshino et al. |
| 5,612,528 A | 3/1997 | Green et al. |
| 5,616,904 A | 4/1997 | Fernadez |
| 5,625,689 A | 4/1997 | Indeck et al. |
| 5,627,357 A | 5/1997 | Cheng et al. |
| 5,647,003 A | 7/1997 | Pease |
| RE35,599 E | 9/1997 | Pease |
| 5,739,517 A | 4/1998 | Hoshino et al. |
| 5,740,244 A | 4/1998 | Indeck et al. |
| 5,767,495 A | 6/1998 | DeLand, Jr. |
| 5,829,743 A | 11/1998 | DeLand, Jr. et al. |
| 5,920,628 A | 7/1999 | Indeck et al. |
| 5,988,500 A | 11/1999 | Litman |
| 6,053,406 A | 4/2000 | Litman |
| 6,098,881 A | 8/2000 | DeLand, Jr. et al. |
| 6,431,445 B1 | 8/2002 | DeLand, Jr. et al. |
| 6,476,743 B1 * | 11/2002 | Brown et al. ................ 341/123 |
| 6,899,269 B1 | 5/2005 | Deland |

OTHER PUBLICATIONS

Written Opinion for International Application No. PCT/US2005/046387, filed Dec. 19, 2005, report completed Sep. 28, 2006 and mailed Oct. 20, 2006, 3 pgs.

* cited by examiner

| Delay Line | Delayed Samples (Length of Tapped Delay) | Bandwidth (Corner Freq, Fc) (KHz) | Output sampling rate (Ksamples/sec) | Max Swipe Speed (inches/sec) |
|---|---|---|---|---|
| 0 | 0 | 15.6 | 250 | 11.3 |
| 1 | 231 | 19.6 | 313 | 14.25 |
| 2 | 568 | 31.25 | 500 | 22.7 |
| 3 | 683 | 39.2 | 627 | 28.5 |
| 4 | 852 | 62.5 | 1000 (=1M) | 45.4 |
| 5 | 887 | 71.4 | 1.143M | 51.9 |
| 6 | 941 | 91 | 1.445M | 66 |

FIG. 11B

Cycles per Magnetic Bit

Frequency Response of Cascade Mean Smoother

Correlation Coefficient Histogram of Authentic (Dashed) and Forged (Solid) Cards

METHOD AND APPARATUS FOR AUTHENTICATING A MAGNETIC FINGERPRINT SIGNAL USING A FILTER CAPABLE OF ISOLATING A REMANENT NOISE RELATED SIGNAL COMPONENT

CROSS-REFERENCE TO RELATED APPLICATIONS

This application is a continuation-in-part of U.S. patent application Ser. No. 10/997,150, filed Nov. 24, 2004, and now abandoned, which is a continuation application of U.S. patent application Ser. No. 09/324,741, filed Jun. 3, 1999, and now U.S. Pat. No. 6,899,269, which is a continuation-in-part of U.S. patent application Ser. No. 09/120,816, filed Jul. 22, 1998, and now U.S. Pat. No. 6,098,881, all of which are hereby incorporated by reference as if set forth in full herein.

BACKGROUND OF THE INVENTION

The present invention relates generally to systems and processes involving the utilization of repeatable magnetic stripe characteristics to authenticate magnetic stripe-bearing documents.

Various forms of cards bearing a magnetic stripe (e.g., magstripe cards) have long been used for a variety of different purposes. Such cards are currently used in large numbers, for example in the forms of credit cards, debit cards, transportation/transit/airline tickets, I.D. cards and so on. Typically the magnetic strips/stripes (also referred to as the magstripes) of such cards carry recorded data relating to the use of the card, and in some instances relating to the assigned user or owner of the card.

Although magnetic stripe cards are widely and successfully used in commerce and industry, counterfeiting and modification of cards (along with other forms of documents) are common occurrences, resulting in great monetary losses. Consequently, the ability to reliably verify the authenticity of documents generally, and specifically of magnetic stripe cards is important.

Over the years, there have been numerous proposals for verifying documents, including the authenticity of magnetic stripe cards. A substantial number of prior proposals have been based on a concept of using certain magnetic characteristics of the magnetic stripe to identify cards. In that regard, it has been determined that generally, the magnetic stripes of individual cards possess inherent, substantially unique, remanent magnetic characteristics that can be repeatedly sensed. These characteristics have been recognized as contributing a noise-like component to sensed signals that is present in repeated sensings. Thus, along with the signal component representing recorded data, the repeatable noise-like signal component also appears. Just as the magnetic characteristics of individual stripes are distinct, the repeatable noise-like signals emanating therefrom are virtually unique among cards. Accordingly, it has been proposed to employ such magnetic characteristics and the resulting repeatable noise-like signals (referred to as the "remanent noise characteristic") as a basis for authenticating individual magnetic stripe cards. U.S. Pat. Nos. 5,365,586, 5,428,683, 5,546,462, 5,587, 654, 5,625,689, 5,740,244, 5,920,628, and 5,959,794 (the disclosures of all of which are incorporated herein by reference) issued to Indeck et al. chronicle the invention of the use of remanent noise characteristics to authenticate various magnetic media. In addition, U.S. Pat. No. 6,098,881 issued to Deland et al., the entire disclosure of which is incorporated herein by reference, discloses using "relatively flat" portions representative of the remanent noise characteristics of the stripe that are located between magnetic transitions to authenticate individual documents.

A major consideration relating to the extensive use of magnetic characteristics for card recognition involves the number of cards in a system. For example, a typical reader must readily accommodate many billions of individual cards operating in combination with millions of individual processing units. In extensive systems, effectiveness and low error rate becomes exceedingly important, particularly in the realms of financial and security transactions, as are involved with bank cards.

SUMMARY OF THE INVENTION

In general, the system of the present invention uses remanent noise characteristics to provide a magnetic characteristic verification technique that operates effectively and reliably in widespread commercial and industrial applications.

Embodiments of the invention select repeatable remanent noise characteristic signals for the magnetic medium (resulting from specific characteristic features of the magstripe) from defined areas of a digitally-recorded magnetic stripe. These remanent noise characteristic signals are also referred to as a magnetic fingerprint due to their repeatable and deterministic characteristics that are virtually unique for each magnetic stripe. The defined areas are located between magnetic data transitions. Such defined areas of the stripe may be magnetized to a level of saturation and would ideally produce relatively flat and stable remanent noise characteristic signals. The signal sensed includes a remanent noise signal component in combination with a recorded data signal component, where the magnitude of the recorded data signal component is much greater than the magnitude of the remanent noise signal component. Although the recorded data signal will be the same for authentic and forged cards, the remanent noise signal will be different for the authentic and forged cards.

One embodiment of the invention includes a sensing unit configured to generate a signal indicative of the magnetic field of the magnetic medium, an analog-to-digital converter (ADC) in communication with the sensing unit and configured to digitize the analog signal, a filter in communication with the ADC configured to enhance the component of the signal associated with the remanent noise characteristic, a data extraction unit, in communication with the ADC and the filter configured to measure at least bit duration and peak location and an authentication extraction unit, in communication with the filter and the data extraction unit configured to extract a set of scaled samples from the output of the filter representative of the remanent noise characteristic.

In a further embodiment, the filter includes a high pass filter.

In another embodiment, the high pass filter includes a mean smoothing filter.

In a still further embodiment, the high pass filter includes a cascade of mean smoothing filters.

In yet another embodiment, the authentication extraction unit includes a sample buffer, an extractor, and a scaler. The sample buffer is configured to store samples of the digitized signal, the extractor is configured to extract a set of samples representative of the remanent noise characteristic, and the scaler is configured to scale the extracted set of samples to a specified data word size.

In a still further embodiment again, the object includes a magnetic stripe bearing card.

An embodiment of the method of the invention includes generating a signal indicative of the magnetic field of the magnetic medium, digitizing the signal, filtering the signal to isolate the portion of the signal indicative of the remanent noise characteristic and extracting a set of samples representative of the remanent noise characteristic.

In a further embodiment of the method of the invention, the filtering is performed using a high pass filter.

In another embodiment of the method of the invention the high pass filter is a mean smoothing filter.

In a still further embodiment of the method of the invention, the filtering is performed using a cascade of high pass filters.

In still another embodiment of the method of the invention, the cascade includes a plurality of mean smoothing filters.

In a yet further embodiment of the method of the invention, extracting a set of samples representative of the remanent noise characteristic comprises scaling the set of samples to a specified data word size.

BRIEF DESCRIPTION OF THE DRAWINGS

In the drawings, like reference characters generally refer to the same parts throughout the different drawings.

FIG. 11B illustrates a table listing various characteristics of delay lines provided by a tapped delay line of the ADC of FIG. 11A;

DETAILED DESCRIPTION

Figure 1:
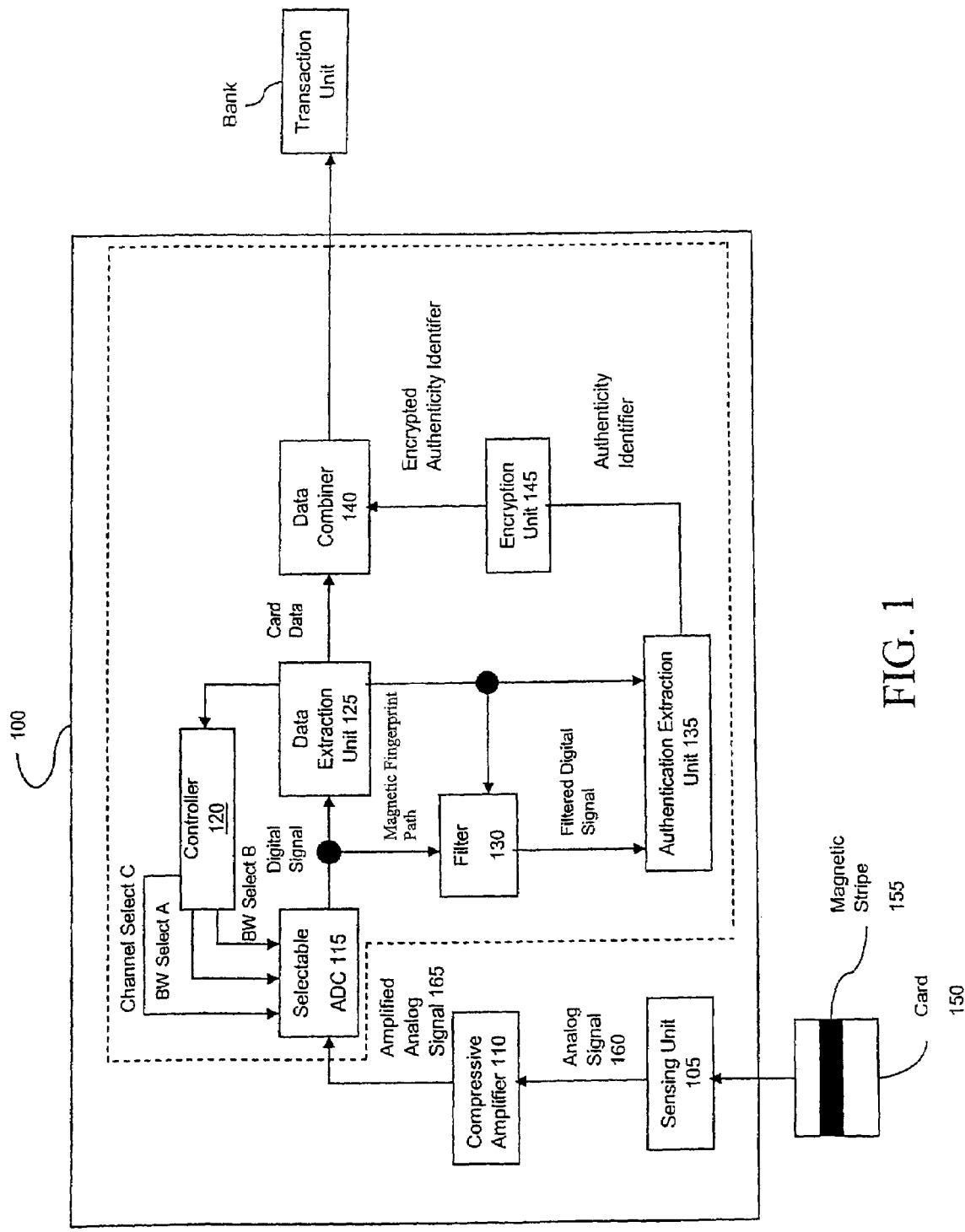
FIG. 1 illustrates an embodiment of a magstripe card reader system in accordance with aspects of the invention.

FIG. 1 illustrates an embodiment of a magstripe card reader system in accordance with aspects of the invention. The magstripe card reader system 100 comprises a sensing unit 105, a compressive amplifier 110, a selectable bandwidth ADC 115, a controller 120, a data extraction unit 125, a filter 130, an authentication extraction unit 135, an encryption unit 145, and a data combiner 140. A transaction unit located outside of the reader system 100, such as at a bank or its processor, receives the data produced by the reader system 100.

In one embodiment, the sensing unit 105 reads the magnetic stripe 155 of a card 150. The analog signal 160 produced by the sensing unit 105 includes a signal indicative of the card data and a remanent noise characteristic signal. As previously mentioned, the card data includes the account-related data that can be easily forged. On the other hand, the remanent noise characteristic is repeatable, deterministic, and virtually unique for a given magnetic medium that serves as an authenticity identifier for the magnetic medium. The remanent noise characteristic is very difficult to forge. The analog signal 160 amplified by the compressive amplifier 110, which preferentially amplifies the remanent noise characteristic signal component over the recorded data signal component. More specifically, the compressive amplifier 110 amplifies the remanent noise signal component with a greater gain than that with which it amplifies the recorded data signal component. The preferentially amplified analog signal 165 is then provided to the selectable ADC 115 for conversion and subsequent digital processing.

The selectable ADC 115 provides analog to digital conversion with variable bandwidths and sampling rates based on the swipe speed of the card 150 at the sensing unit 105. To provide variable bandwidths and sampling rates, the selectable ADC 115 receives bandwidth and sampling rate select data from a controller 120, which is in communication with the data extraction unit 125. The digital signal produced by the selectable ADC 115 is provided to the data extraction unit 125 and the high pass filter 130.

The data extraction unit 125 determines bit duration (which indicates swipe speed) and peak locations, and provides these data to the controller 120, the filter 130, and the authentication extraction unit 135. In some embodiments, the filter 130 is a mean-smoothing high pass filter with variable filter length based on the swipe speed. The filter 130 filters out the data signal to leave the relatively flat remanent noise-like characteristic signal from the portion of the signal that is the remanent noise characteristic. The filtered digital signal with the relatively flat area of remanent noise characteristic is received by the authentication extraction unit 135. A selected group of samples are extracted and scaled by the authentication extraction unit and then encrypted using an encryption unit 145 using well known encryption schemes. In preparation for transmission to a transaction unit, the encrypted remanent noise characteristic samples are combined, using the data combiner 140, with the card data from the data extraction unit 125.

The encrypted samples and card data are provided to a transaction unit residing at an off-site secure location, such as a bank. The transaction unit compares the samples of the remanent noise characteristic (also referred to as the sensed magnetic fingerprint) with a reference magnetic fingerprint. Based on the result of the comparison, the transaction unit may approve the transaction contingent upon the magnetic fingerprint positively indicating that the card 150 is authentic. The reference comparison involves comparing a fingerprint taken from the authentic card with the magnetic fingerprint provided to the transaction unit for the purpose of authentication. The reference magnetic fingerprint can be obtained at the time that the card is issued or in the field. In some embodiments, the reference fingerprint associated with the card data, e.g., account number, is retrieved from a database storing a plurality of reference fingerprints associated with a plurality of cards.

Discussing the components of the reader system 100 of FIG. 1 in more detail, the sensing unit 105 reads the magnetic medium of an object being offered for authentication. The sensing unit 105 includes any standard read head, such as an inductive magnetic transducer head. In some applications, only a limited size of data, e.g., 48 bytes of the remanent noise component, can be accommodated in the packets transmitted to the bank. Preferably, track 2 is a low density track with 75 bits per inch (bpi). In a preferred embodiment, a read head should have a small enough gap or a slit to capture adequate detail about the remanent noise component within the 48 byte size limitation. Thus, while a variety of read heads are suitable for use with the present invention, a preferred read head has a gap that is ½ mil or ½×10E−3 inches, such as Model 21052045 read head manufactured by MagTek, Inc. of Carson, Calif.

In one embodiment, the object being authenticated by the present invention is a magnetic data card 150 such as a credit card, ATM card or debit card. The present invention may also be used to authenticate any object having a magnetic medium such as a magstripe, or magnetic stripe 155, upon which data is stored. Such objects include, but are not limited to, security badges/cards, floppy disks, cassette tapes (both VCR and audio tapes), and documents such as bank checks.

Figure 2:
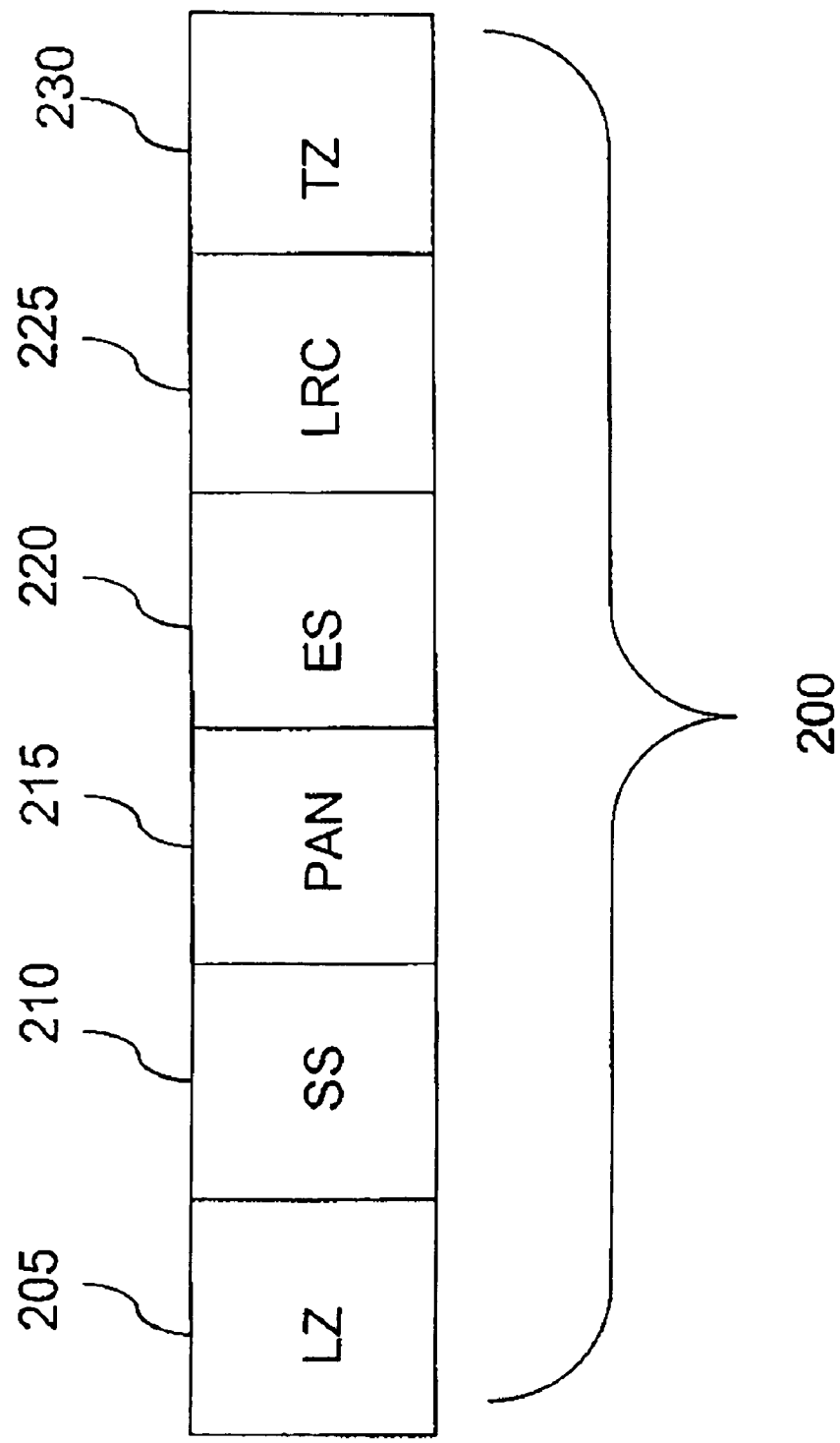
FIG. 2 is a graphic representation of a portion of a typical format of a track 200 of the magnetic stripe 155 as shown in FIG. 1.

Data can be recorded in tracks on a magnetic stripe. FIG. 2 illustrates a typical format of track two of an International Standards Organization (ISO) 7811 card, denoted as track 200 of the magnetic stripe 155 in FIG. 1. The low density track two (typically having 75 bpi) is preferred over high density tracks one and three (typically having 210 bpi). The track 200 includes a plurality of sections, such as LZ 205, SS 210, PAN 215, ES 220, LRC 225 and TZ 230. Section LZ 205 stores a series of leading zeros (e.g., approximately twenty) designated as LZs. Section SS 210 carries a start sentinel SS indicating the beginning of card data and has 5 magnetic bits to represent special characters of standard banking or credit cards as defined by ISO. Section PAN 215 can carry 40 digits of data; each digit ranging from 0 to 9 and represented by a group of 5 magnetic bits. Section ES 220 carries the end sentinel ES character indicating the end of the card data also represented by a group of 5 magnetic bits. LRC 225 section carries longitudinal redundancy check, which comprises an error detection code providing a parity check on all the characters. TZ 230 section carries at least 20 trailing zeros. Along with the format of FIG. 2, a wide variety of formats may be employed in systems of the present invention.

In one implementation, wherein each character or number is represented by a group of 5 magnetic bits, the 4 least significant bits (LSBs) represent the number or character and the most significant bit (MSB) represents a parity check bit appended to the first 4 bits.

Figure 3:
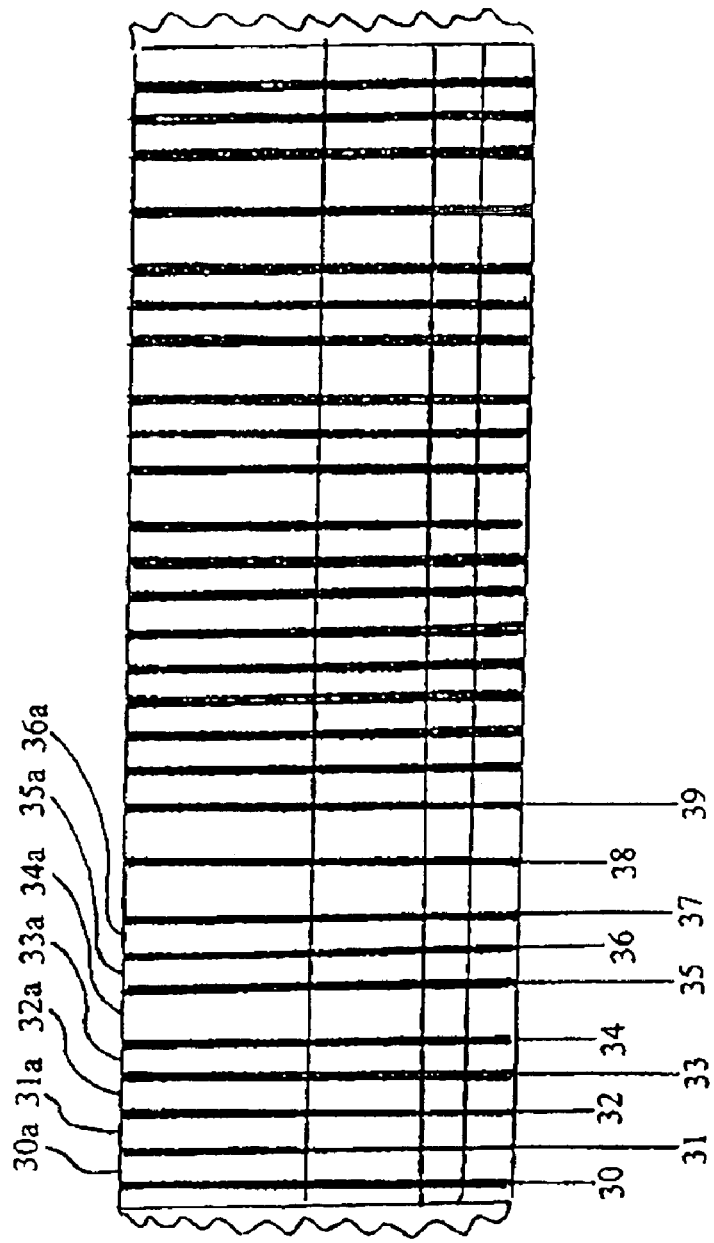
FIG. 3 is a grossly-enlarged pictorial of a magnetic data pattern showing a small portion of the stripe track of FIG. 2.

FIG. 3 is a grossly-enlarged pictorial of a magnetic data pattern showing a small portion of the stripe track of FIG. 2. The remanent noise characteristic regions are separated by magnetic transitions (representing data). As illustrated in FIG. 3, individual magnetic transitions 30-39 define magnetized regions 30a-36a with remanent noise characteristics therebetween. In FIG. 3, the magnetic bits representing the recorded data are defined by the distance between the magnetic transitions. For example the transitions between 30 and 32, 32 and 34, 34 and 35, 35 and 37, 37 and 38, and 38 and 39 are relatively the same distance, and the area between two transitions represents a magnetic bit. The bits having mid-transitions (e.g., 31, 33 and 36) between the transitions represent is, and the bits without the mid-transitions represent 0s. Thus, the magnetic bits from the transitions 30 to 39 represent 110100 from left to right.

It is important to note that the present invention preferably derives the magnetic stripes' remanent noise characteristics from the magnetized regions, such as the regions denoted 30a-36a. When sensed by the sensing unit 105 and amplified preferentially, these regions 30a-36a generate analog signals that are less dominated by the data signal than the magnetic transition regions 30-39.

Figure 4:
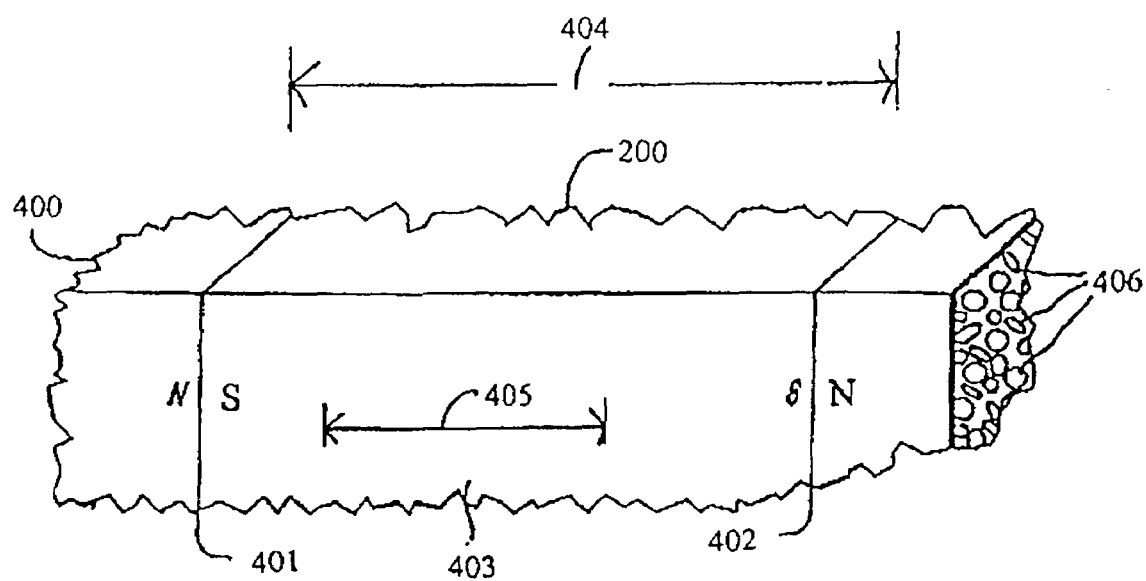
FIGS. 4-6 illustrate a related set of various representations of a small portion of a track in FIG. 2.

FIG. 4 illustrates a grossly enlarged fragment 400 of the magnetic stripe track 200 of FIG. 2. A pair of magnetic transitions 401 (N/S interface) and 402 (S/N interface) (representing data) define a magnetized region 403 therebetween. Incidentally, individual magnetic particles 406 also are indicated in the cross section (right). As has generally been recognized in the past, it is the inherent variations and orientations of these particles 406 that account for the magnetic characteristic (magnetic fingerprint) of the stripe 200. Interval 405 illustrates a preferred sampling interval in the middle of the magnetic transitions 401 and 402.

Figure 5:
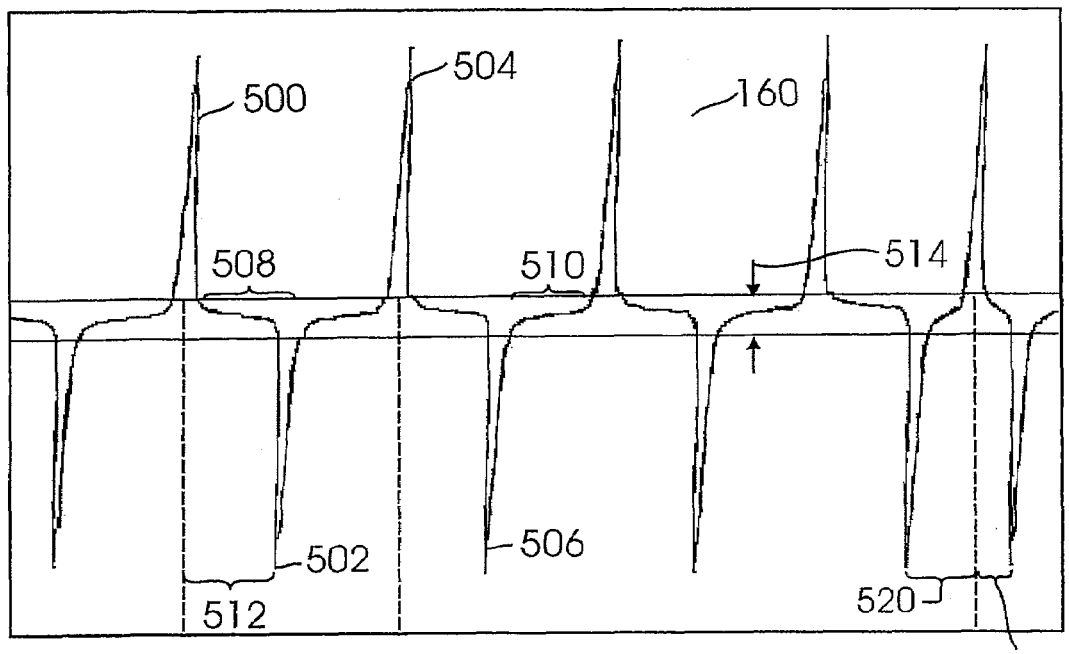

FIG. 5 illustrates an analog signal 160 (as shown in FIG. 1) sensed from the magnetic transitions 401 and 402 of FIG. 4. The analog signal 160 comprises signal peaks, some of which are denoted as 500, 502, 504, 506 at the extreme ends of the interval 403 (as shown in FIG. 4), separated by signal portions of much lower amplitude. The peaks 500, 502, 504, 506 and so on correspond to the data stored magnetically on the card. The magnetized regions 30a to 36a (shown in FIG. 3) in the preferred interval 405 (Shown in FIG. 4) translate to the central portion 508 of FIG. 5 between peaks 500 and 502 of the analog signal.

The remanent noise characteristic gives rise to the low amplitude fluctuations in the analog signal, appearing throughout the length of the analog signal central portion 508, as well as the next central portions, such as 510. The central portions, such as 508 and 510, are the portions from which the remanent noise characteristic is preferably identified.

Still referring to FIG. 5, in one embodiment, the analog signal is sampled between a positive peak 500 and the closest negative peak 502 from the positive peak. Each peak will act as a marking point for the samples of interest representing the remanent noise characteristic to be captured. Thus, when digital samples representing the captured analog signal are compared against a reference signal at the transaction unit of FIG. 1, it is assumed that the digital samples and the reference signals were extracted from substantially similar peak intervals (the difference in registration being approximately ½ um). In this embodiment, the distance of separation between two peaks, such as 512 and 520, determines the encoding of the measured analog signal. For example, for a long separation, such as 512, 0 is encoded and for a short pair of separations, such as 520 and 522, 1 is encoded.

Figure 6:
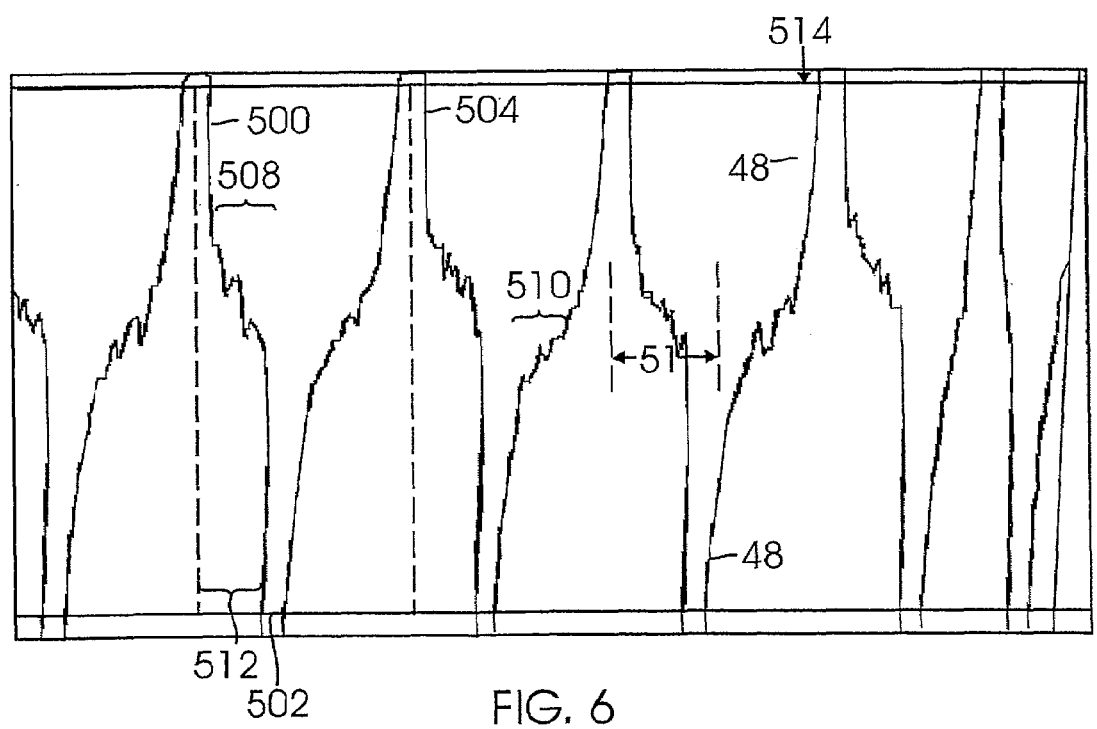

FIG. 6 illustrates an expanded view of the analog signal within the window 514 of FIG. 5. The peaks, such as 500 and 504, have an amplitude of approximately 2 mV per inch per second (ips) for a typical inductive read head. The amplitude of the remanent noise signal ranges from 0.05% to 2% of the peak amplitude, ranging from 1 uV to 40 uV per ips. Thus the data-to-remanent noise magnitude ratio ranges from approximately 2000:1 to 50:1.

The remanent magnetic characteristic signal component from the interspersed portions, such as 508 and 510 (FIGS. 5 and 6) of the waveform 160 (FIG. 5) may be isolated or extracted from the analog signal 160 (FIG. 1) using a variety of techniques.

Referring back to FIG. 1, in one embodiment, prior to extracting the remanent magnetic characteristic signal component, the compressive amplifier 110 receives the analog signal 160 from the sensing unit 105 and preferentially amplifies the remanent noise characteristic of the analog signal. The compressive amplifier 110 is configured to provide different levels of amplification for the relatively high amplitude input signals (peaks) and the relatively low amplitude input signals (remanent magnetic characteristic signal component). For example, the portion of the analog readback signal from which the remanent noise characteristic is determined (a portion that has a relatively low signal amplitude) receives greater amplification than the portion of the analog readback signal corresponding to the data signal (a portion that has a relatively high signal amplitude).

Accordingly, the range of the amplified signal corresponding to the remanent noise characteristic is expanded relative to the range of the amplified signal corresponding to the data signal. Thus, without resorting to more expensive wider bit digitizers, a high degree of resolution is available in the expression of the signal portions corresponding to the remanent noise characteristic. A greater percentage of the digitizer bit values are focused within the remanent noise characteristic's dynamic range. Accordingly, precise quantization of the magnetic medium's remanent noise characteristic can be achieved using a lower bit width digitizer than would have been previously needed to obtain such a high degree of resolution.

Figure 7:
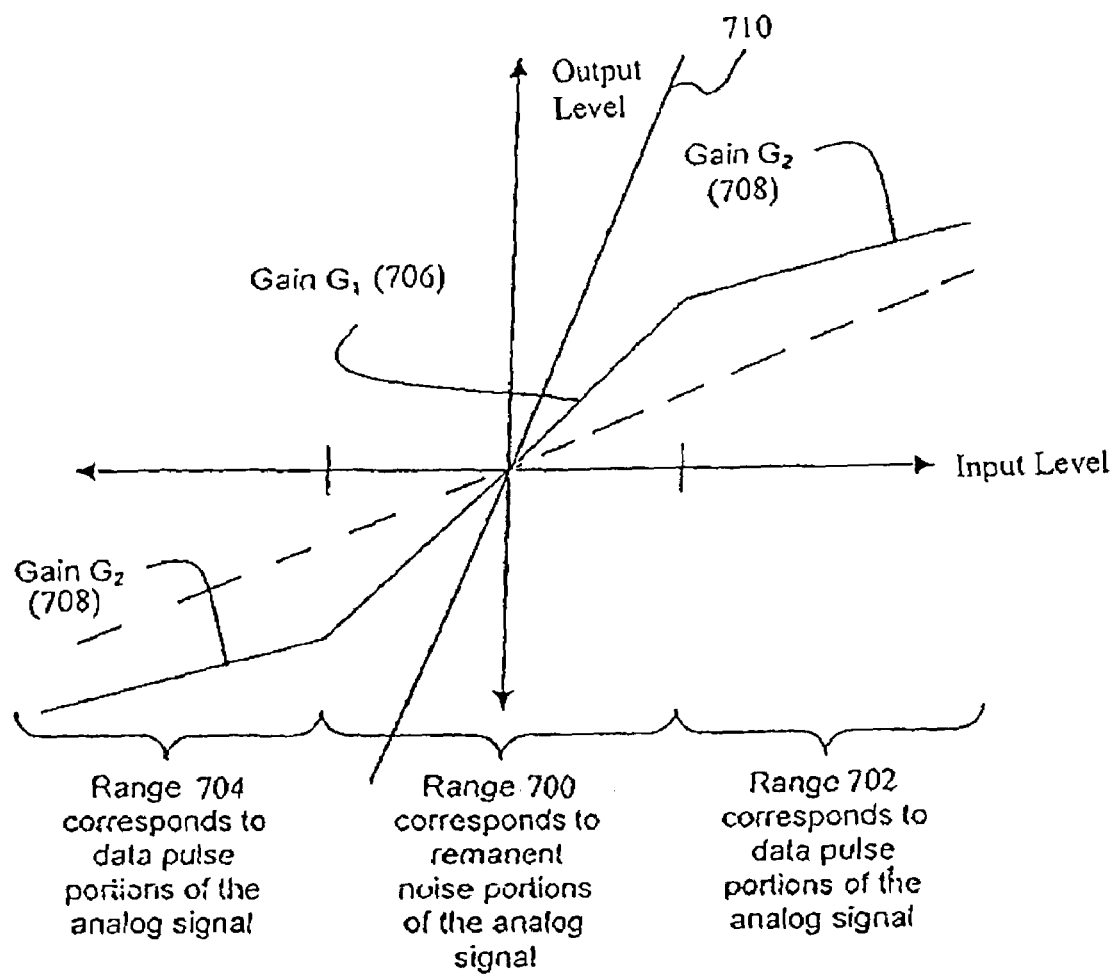
FIG. 7 illustrates a plot showing output signal level versus input signal level for a linear amplifier and a compressive amplifier of the present invention.

More specifically, FIG. 7 illustrates a plot of the output signal strength versus the input signal strength for a linear amplifier (denoted as 710) and a compressive amplifier (in solid lines, denoted as 706 and 708) of the present invention. The gain provided to the input signal is discernible from the slope of the plot; a steeper slope corresponds to a higher gain than a gentler slope. Thus in FIG. 7, the gain characteristic of the compressive amplifier, denoted as 706 and 708, indicates that the gain 706 provided to input signals with levels in range 700 is greater than the gain 708 provided to input signals with levels in ranges 702 and 704.

Range 700 corresponds to relatively low level input signals. The width of range 700 is preferably set to substantially coincide with the amplitude of the magnetic medium's sensed remanent noise, which typically ranges from 1 uV to 40 uV per ips. Ranges 702 and 704 correspond to relatively high level input signals. The width of ranges 702 and 704 are preferably set to substantially coincide with the amplitude of the data portions of the analog signal, which is approximately 2 mV per ips. The level of remanent noise gain 706 and data gain 708 may be selected and adjusted as needed. In one embodiment, the level of remanent noise gain 706 is 40, whereas the level of data gain 708 is 6.

FIG. 7 also depicts the gain characteristics of a linear amplifier as a straight line 710. Unlike the dynamically configured gain characteristics of a compressive amplifier, the linear amplifier provides the same level of amplification for the entire range of the input analog signal. Thus, for both the data portions and the remanent noise portions of the analog signal, the slope of the gain 710 remains the same, equally amplifying both the data portions and the remanent noise portions. As previously discussed, when using a linear amplifier, the amount of amplification should be limited to prevent "clipping" of the peaks, which results in less than desirable gain for the weaker remanent noise component of the analog signal. To compensate for the limited level of amplification provided by the linear amplifier, a wider bit digitizer (ADC) should be used.

Figure 8:
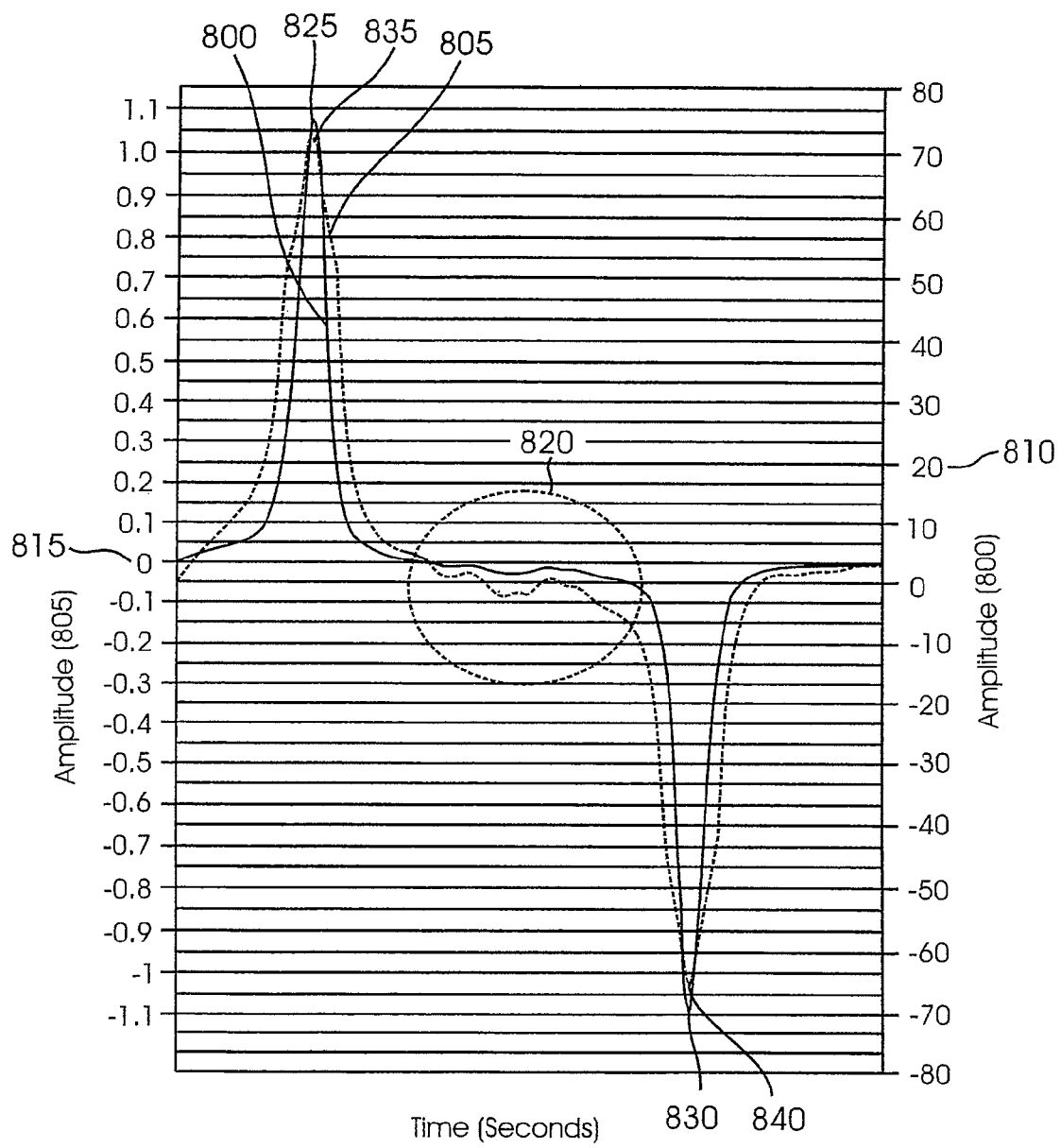
FIG. 8 is a plot illustrating an uncompressed signal generated by the sensing unit and a compressed signal generated by the compressive amplifier of the reader system of FIG. 1.

FIG. 8 illustrates a comparison between an uncompressed analog signal 160 from the sensing unit 105 and a compressed signal 165 from the compressive amplifier 110 of the reader system of FIG. 1. In FIG. 8, the uncompressed signal is represented in a solid line 800. The right vertical axis 810 corresponds to the amplitude of the uncompressed signal 800. The compressed signal is represented in a dotted line 805. The left vertical axis 815 corresponds to the amplitude of the compressed signal 805. The horizontal axis corresponds to time for both uncompressed and compressed signals.

In the example of FIG. 8, the analog signal corresponding to the data peaks has been amplified by a factor of 13, whereas the analog signal corresponding to the remanent noise characteristic has been amplified by a factor of 25. As demonstrated in portion 820, a high degree of resolution is available for the remanent noise characteristic that has been compressively amplified. Once the signal portion corresponding to the remanent noise characteristic is enhanced by the compressive amplifier, the relatively flat remanent noise signal in portion 820 is in fact a slightly down-sloping signal exhibiting various levels of amplitude fluctuations throughout the width of the portion 820.

Figure 9:
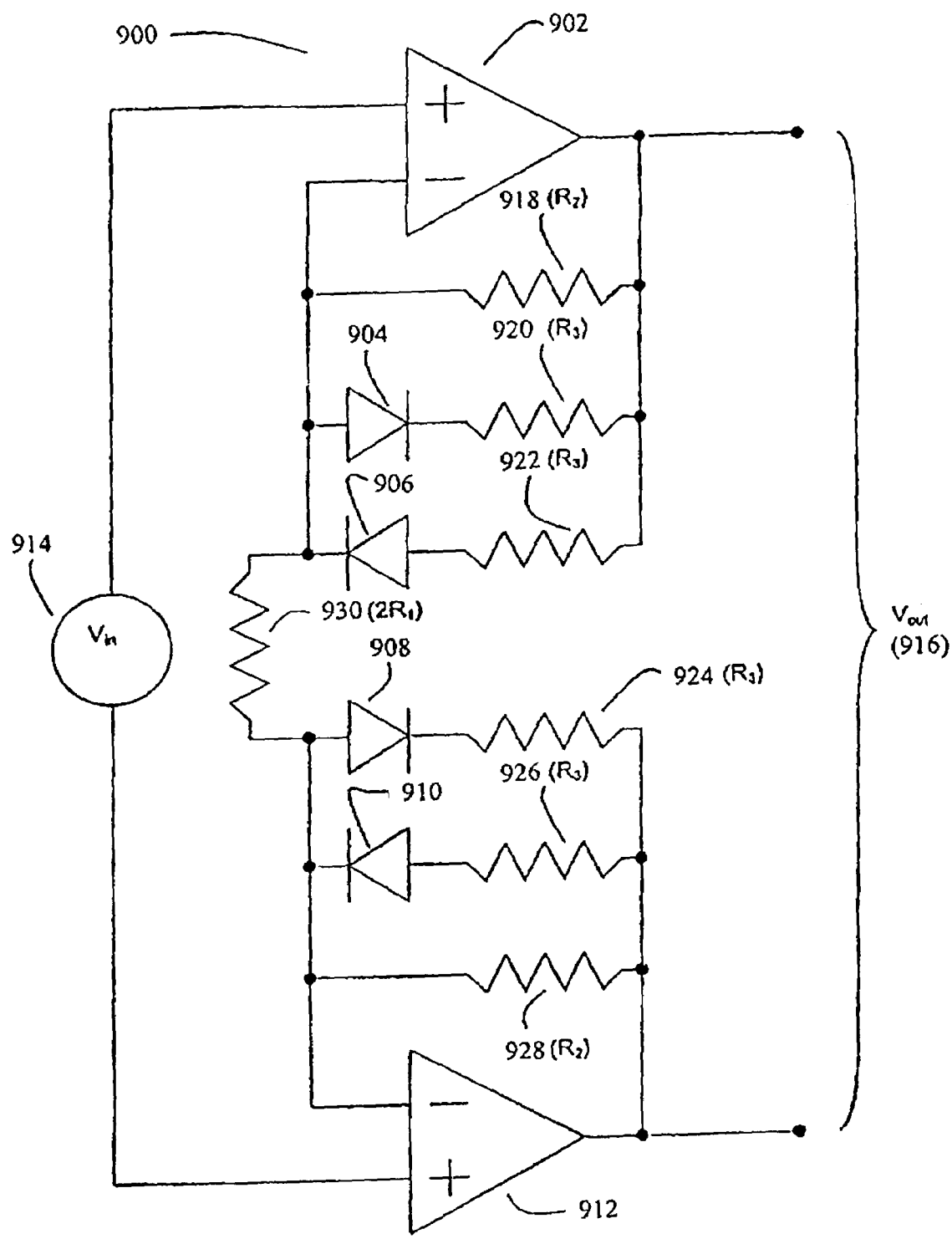
FIG. 9 illustrates one exemplary architecture of a compressive amplifier constructed in accordance with aspects of the invention.

FIG. 9 illustrates an embodiment of a compressive amplifier 900 in accordance with the present invention with the gain characteristics as shown in FIG. 7. The compressive amplifier 900 of FIG. 9 is a differential circuit comprising two op-amps 902 and 912, each having an input voltage 914 applied to its positive (+) input. The input voltage 914 is the analog signal that has been generated by a transducer head of the sensing unit of FIG. 1. The feedback loop from the output of the op-amp 902 to the negative (−) input comprises parallel paths of (1) a resistor 918, (2) a resistor 920 and a diode 904, with the diode 904's cathode connected to the resistor 920 and the diode 904's anode connected to the negative (−) input of the op-amp 902, and (3) a resistor 922 and a diode 906, with the diode 906's anode connected to the resistor 922 and the diode 906's cathode connected to the op-amp 902's negative (−) input. The resistor 918 has a value of R2 and resistors 920 and 922 both have values of R3. The feedback paths also provide a resistor 930 to the negative (−) input of the op-amp 902. The resistor 930 has a value of 2R1.

The op-amp 912 is similar to the op-amp 902. The feedback loop from the output of the op-amp 912 to the negative (−) input comprises parallel paths of (1) a resistor 928, (2) a resistor 926 and a diode 910, with the anode of the diode 910 connected to resistor 926 and the cathode of the diode 910 connected to the negative (−) input of the op-amp 912, and (3) a resistor 924 and a diode 908, with the cathode of the diode 908 connected to the resistor 924 and the anode of the diode 908 connected to the op-amp 912's negative input. Resistor 928 has a value of R2, and resistors 924 and 926 both have values of R3. The feedback paths also couple the resistor 930 to the negative (−) input of the op-amp 912.

The circuit of FIG. 9 operates to compressively amplify the input signal 914 in accordance with the gain characteristics 706 and 708 of FIG. 7. For the portions of the input signal 914 having smaller amplitudes, corresponding to the remanent noise characteristic of the input signal, the diodes 904, 906, 908, and 910 are not forward-biased, thus the gain for the remanent noise characteristics, denoted as G1, is:

$$G_1 = 1 + \frac{R_2}{R_1}$$

For the portions of the input signal 914 having larger amplitudes, corresponding to the data portions of the input signal, large input voltage causes the feedback diodes 904, 906, 908, and 910 to become forward-biased, thus the gain for the data portions, denoted as G2, is determined by the parallel combination of R2 and R3. The gain G2 is calculated by:

$$G_2 = 1 + \frac{\left(\frac{R_2 R_3}{R_2 + R_3}\right)}{R_1}$$

R3 is selected to be less than R2 to cause the gain for large voltage inputs to be less than that of small voltage inputs. For a preferred G1 value of 25 and a preferred G2 value of 3, and selecting R3 value of 22 KΩ, algebraic processing of the calculations of G1 and G2 above provide values for R1 and R2 to achieve the desired gain values as follows:

$$R_1(G_1, G_2, R_3) := R_3\left(\frac{(-G_2 + G_1)}{G_1 G_2 - G_2 - G_1 + 1}\right)$$

$$R_2(G_1, G_2, R_3) := R_3\left(\frac{(-G_2 + G_1)}{G_2 - 1}\right)$$

By entering the desired values for G1 and G2 and the selected value for R3 into the above formulas for R1 and R2, a preferred value for R1 is $1.008 \times 10^4$. Similarly, a preferred value for R2 is $2.42 \times 10^5$.

Figure 10:
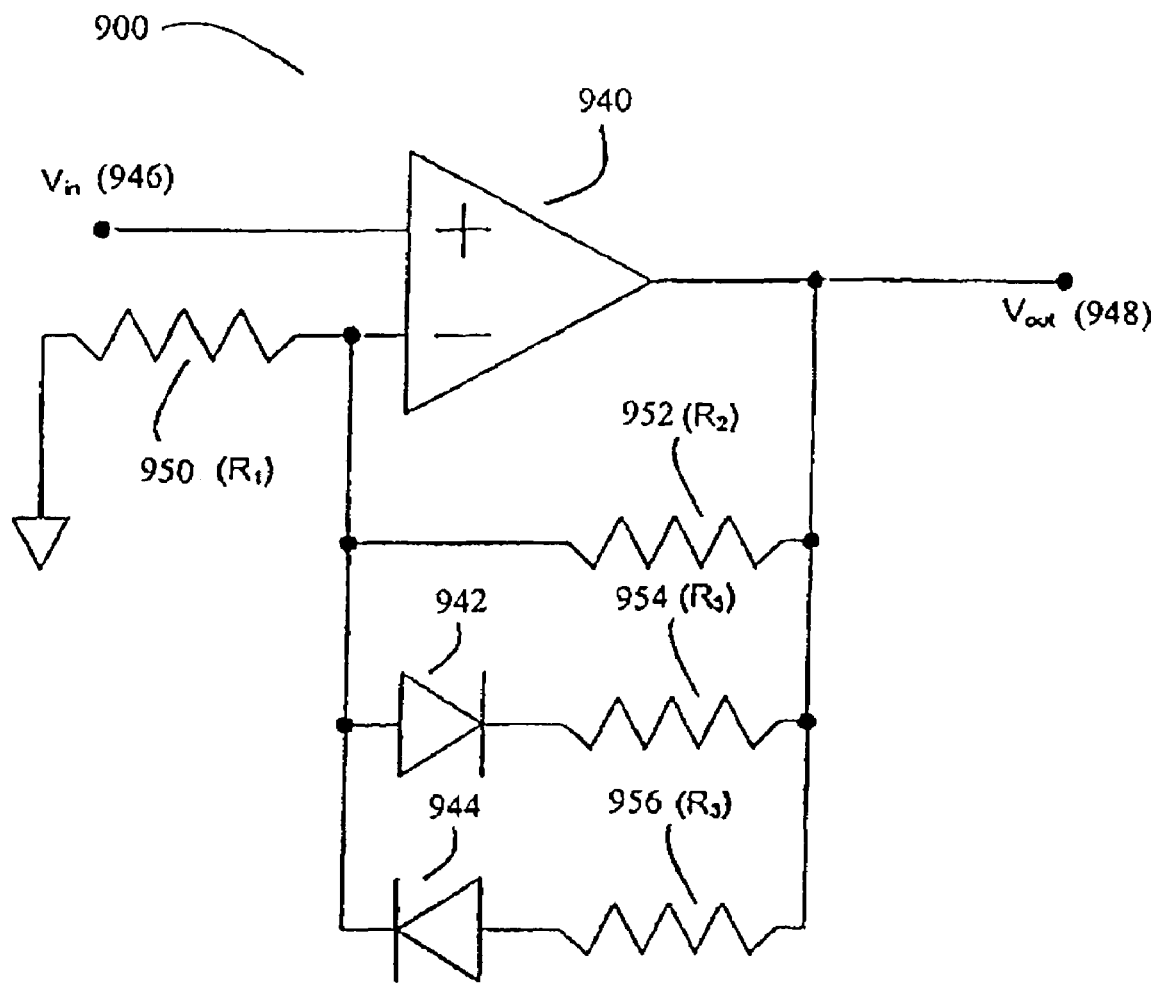
FIG. 10 illustrates another exemplary architecture of a compressive amplifier constructed in accordance with aspects of the invention.

The differential circuit of FIG. 9 can also be implemented as a single-ended circuit of FIG. 10. FIG. 10 illustrates another architecture of a compressive amplifier. The compressive amplifier 900 of FIG. 10 comprises an op-amp 940 that receives an input voltage 946 (the analog readback signal) at its positive (+) input, and produces an output voltage 948. The compressive amplifier 900 comprises a resistor 950 having a value of R1 connected between the negative (−) input of the op-amp 940 and ground. The compressive amplifier 900 also comprises a feedback loop from the output of the op-amp 940 to the negative (−) input of the op-amp 940 with three parallel paths (1) a path comprising a resistor 952, having a value of R2, (2) a path comprising a resistor 954, having a value of R3 and a diode 942 with the diode 942's cathode connected to the resistor 954 and the diode 942's anode connected to the negative (−) input of the op-amp 940, and (3) a path comprising a resistor 956, having a value of R3 and a diode 944, with the diode 944's anode connected to the resistor 956 and the diode 944's cathode connected to the negative (−) input of the op-amp 940. The gain for the remanent noise characteristics, denoted as $G_1$, and the gain for the data portions, denoted as $G_2$, can be determined from the same formulas used for the differential compressive amplifier of FIG. 9.

Referring back to FIG. 1, an analog-to-digital converter (ADC) 115 receives the amplified analog signal 165 from the compressive amplifier 110. When an inductive magnetic reading head is used in the sensing unit 105, the magnitude of the analog signal provided to the ADC 115 is proportional to the speed of the magnetic stripe as it is swiped past the magnetic reading head. Swipe speeds can vary and are typically measured in the range of 4-80 inches per second. The bandwidth of the analog signal is also directly proportional to the swipe speed. If the bandwidth of the system remains unmatched to that of the sensed analog signal, the system is left with extra bandwidth that can corrupt the output signal with unwanted noise. The problems created by extra bandwidth are most evident for slower swipes, where the relatively small signals generated are more readily corrupted by the unnecessary wideband noise signal.

Figure 11A:
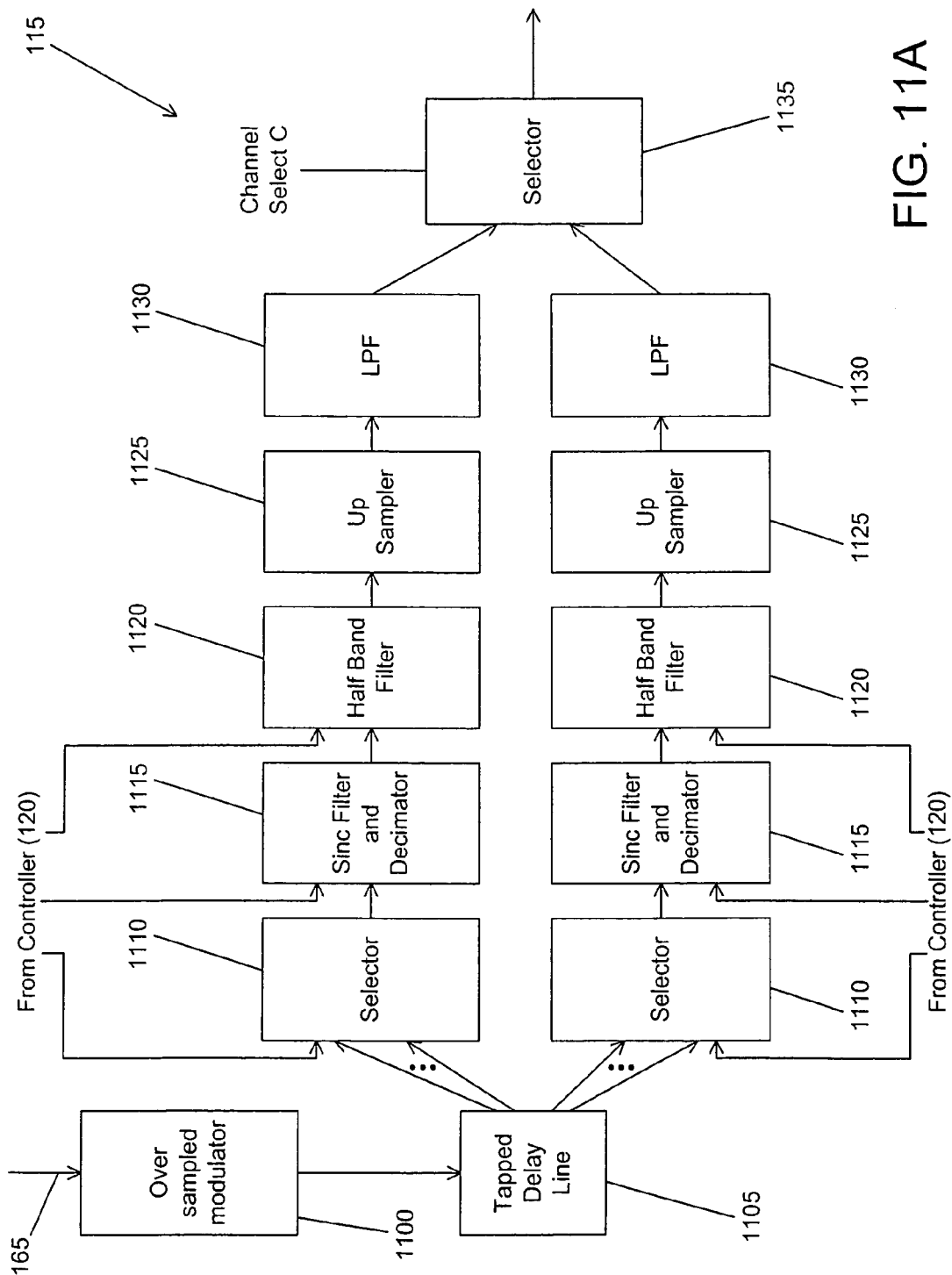
FIG. 11A illustrates an embodiment of an analog-to-digital converter (ADC) with multiple selectable bandwidths constructed in accordance with aspects of the invention.

FIG. 11A illustrates an embodiment of an ADC with an adjustable bandwidth in accordance with aspects of the invention. The ADC 115 includes an over-sampled modulator 1100 that is connected to a tapped delay line 1105. As known in the art, modulators may be of various orders, where the order of the modulator is determined by the number of integrators in it. The various outputs of the tapped delay line are connected to each of a plurality of channels. In the illustrated embodiment, two channels are shown. Other embodiments can include a single channel or more than two channels.

Each channel comprises a selector 1110 that is connected to a sinc$^n$ filter and decimator 1115. Sinc$^n$ filters are "box-car" running average filters that are cascaded such that the order n of the sinc$^n$ filter is one greater than the order of the modulator. For example, in one embodiment a second order modulator is employed in conjunction with a third order sinc (sinc$^3$ or sinc-cubed) filter. The sinc$^n$ filter can also be referred to as a "sinc filter". Both the selector 1110 and the sinc filter and decimator 1115 are connected to the controller 120. The sinc filter and decimator is also connected to a half band filter 1120. The half band filter 1120 is connected to an up sampler 1125, which is connected to a low pass filter 1130. The outputs of the low pass filters 1130 in each of the channels are connected to another selector (selector C) 1135. Selector C 1135 is also connected to the controller via a channel select C connection. Selector C 1135 provides a digital output of the ADC indicative of samples of the input analog signal at the decimated sampling rate.

In one embodiment, the over-sampled modulator 1100 receives the amplified analog input signal 165 from the compressive amplifier 110. The amplified analog input signal 165 can include a high-amplitude data signal component and a low-amplitude remanent noise characteristic component. The over-sampled modulator 1100 samples the input signal at the sampling frequency (Fm). The sampling frequency (Fm) is much higher than the Nyquist frequency, which is at least twice the bandwidth of the input signal.

As described above, the output of the over-sampled modulator 1100 can be provided to a tapped delay line 1105. In one embodiment, the tapped delay line 1105 includes a number of outputs (n) that provide the previous n−1 outputs of the over-sampled modulator 1100.

In several embodiments, the ADC channels include a selector 1110 connected to each of the outputs of the tapped delay line. The selection of an output of the tapped delay line can be coordinated via a signal from the controller 120. The selected output is provided to the channel's sinc filter and decimator 1115. The reduction in the sampling rate caused by the decimator 1115 can be selected using a select line from the controller 120. The reduction in sampling rate varies as the decimator 1115 attempts to match the sampling rate to the Nyquist frequency of the particular signal generated by a card swipe. The sinc filter prevents aliasing otherwise created by the decimating process.

Figure 11C:
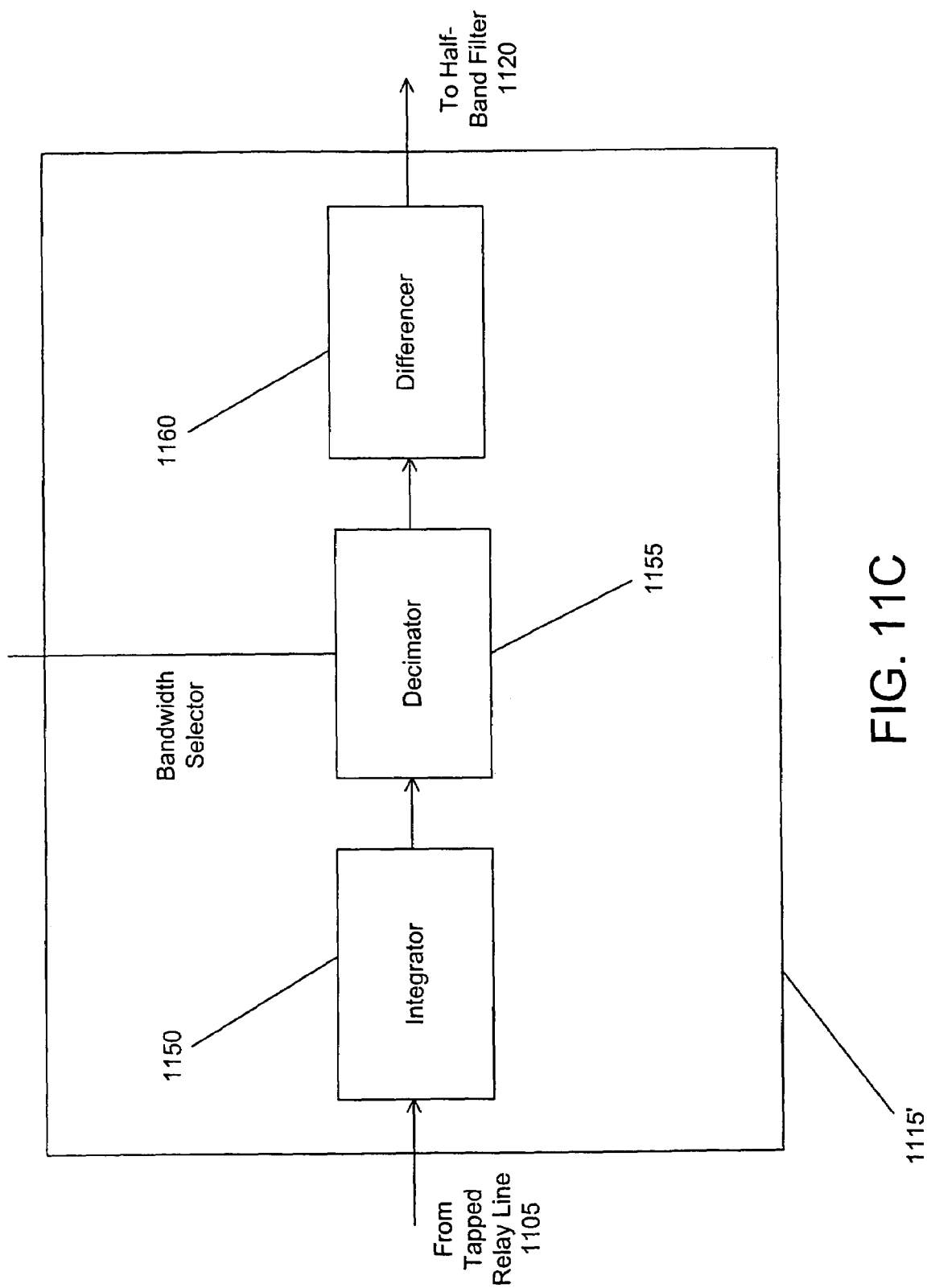
FIG. 11C illustrates an embodiment of a sinc filter and decimator 115 in the ADC of FIG. 11A.

A sinc filter and decimator in accordance with an embodiment of the present invention is shown in FIG. 11C. The sinc filter and decimator 1115' includes an integrator 1150, a decimator 1155 and a differencer 1160. In several embodiments, the sinc filter's integrator length and the decimator rate are variable and can be selected to accommodate variable signal bandwidth.

Turning back to FIG. 11A, the output of the sinc filter and decimator 1115 is provided to a half-band filter 1120. In one embodiment, the bandwidth of the half-band filter 1120 is variable and can be selected (by selection of a suitable decimation rate) to accommodate variable signal bandwidth. Typically, the bandwidth of the half-band filter is chosen to attenuate as much of the noise in the unused portions of the frequency spectrum as possible. In embodiments where the decimator down samples to the Nyquist rate of the received signal, the half-band filter applies greater attenuation to frequencies greater than half the Nyquist frequency.

In several embodiments, an up-sampler 1125 is provided after the half-band filter 1120. The up-samplers 1125 operate at a frequency, Fs, which is 4 times faster than Fd (i.e. the decimated operating rate of the half-band filter). The high sampling rate of the up-sampler 1125 interpolates new samples between successive values of the half-band filter 1120 output signal which provides a finer grid of samples. Aliasing within the interpolated samples can be removed by passing the signal through a low pass reconstruction filter 1130. The up-sampled signal provides sufficient resolution that it can be used to extract information concerning the remanent noise characteristic of a magnetic stripe from the signal generated by the magnetic stripe.

The output of the low pass filter 1130 from each channel is provided to the selector C 1135. The output chosen as the output of the ADC is determined based on an input select signal, which can be provided by the controller.

In operation, the bandwidth of the signal can change during the card swipe. The previous bit duration can be used to set an appropriate bandwidth and associated sampling rate for the ensuing bit. Determination of bit duration can be performed in a variety of ways. In one embodiment, the bit duration is measured as the time between peaks in the ADC signal output. Peaks can be detected by determining whether a value is greater than previous values for a predetermined period of time. The length of the predetermined time period can influence the accuracy of peak detection. The shorter the period of time, the greater the possibility that a "detected" peak is an aberration.

The time required to determine that a peak has occurred can result in the bit duration remaining unknown for a predetermined period of time during the subsequent bit. In instances where the bit duration is unknown for a period during the subsequent bit and a single channel is used, the channel is flushed and restarted using the new bandwidth. During the additional time required for the channel's output to settle, the output of the channel may not be indicative of the magnetic field of the magnetic stripe. In several embodiments, the settling time is sufficiently short to enable data to be collected during the subsequent bit interval.

In instances where the bit duration is unknown for a period during the subsequent bit and a multiple channel system is used, a second channel can be started once the bit duration is known. During the time required for the output of the second channel to settle, the output of the first channel can be used as the output of the ADC. Once the second channel has settled, the output of the second channel can be used as the output of the ADC. The output of the first channel and the second channel can be synchronized by choosing an appropriate relative delay between the first channel and the second channel from the tapped delay line 1105.

In one embodiment, the data extraction unit (DEU) 125 determines the bit durations and provides this information to the controller 120. The controller 120 uses the information concerning the bit duration to set the delay and sampling rate (and hence bandwidth) for a channel by using the selector 1110 to select an appropriate output from the tapped delay line and concurrently providing an appropriate select signal to the sinc filter, decimator 1115, and half-band filter 1120. The output of the channel can then be selected using the selector C 1135. As indicated above, the bandwidth of the ADC can be modified during the swipe by the controller. The controller configures a second channel in the manner described above based on the most recent bit duration. When the next bit arrives, the controller 120 stops using the first channel to sample and digitize the incoming signal. Instead, the controller 120 selects the output of the second channel using the selector C 1135. The tapped delay line 1105 maintains appropriate spacing between samples by delaying one channel relative to the other channel, so that both paths can be synchronized at the final selector C 1135. By repeating the above process during each bit interval, the controller 120 is able to continually adjust (within bounds) the bandwidth of the ADC in response to variations in the speed at which a magnetic stripe is being swiped past an inductive magnetic reading head.

In one embodiment, the over-sampled modulator has a sampling frequency, Fm, at 8 MHz, which generates a sequence of 0s and 1s separated in time by 125 nsec. In addition, the outputs of the tapped delay line and the frequencies of each of the channels are configured to enable the control to select from the delays and frequencies shown in the table of FIG. 11B. FIG. 11B illustrates a table listing the number of delayed samples (e.g., length of tapped delay), bandwidth (e.g., corner frequency, Fc), output sampling rate, and maximum swipe speed associated with each selection from 0 to 6. In other embodiments, more or fewer outputs can be provided by the tapped delay line and other combinations of delays and sampling rates can be used.

In other embodiments, other configurations are possible including using a sigma delta modulator in conjunction with a low pass filter. The ADC can be implemented by a variety of hardware components that enable modification of the ADC bandwidth and associated sampling rate in response to variation in speed during a card swipe.

Figure 12:
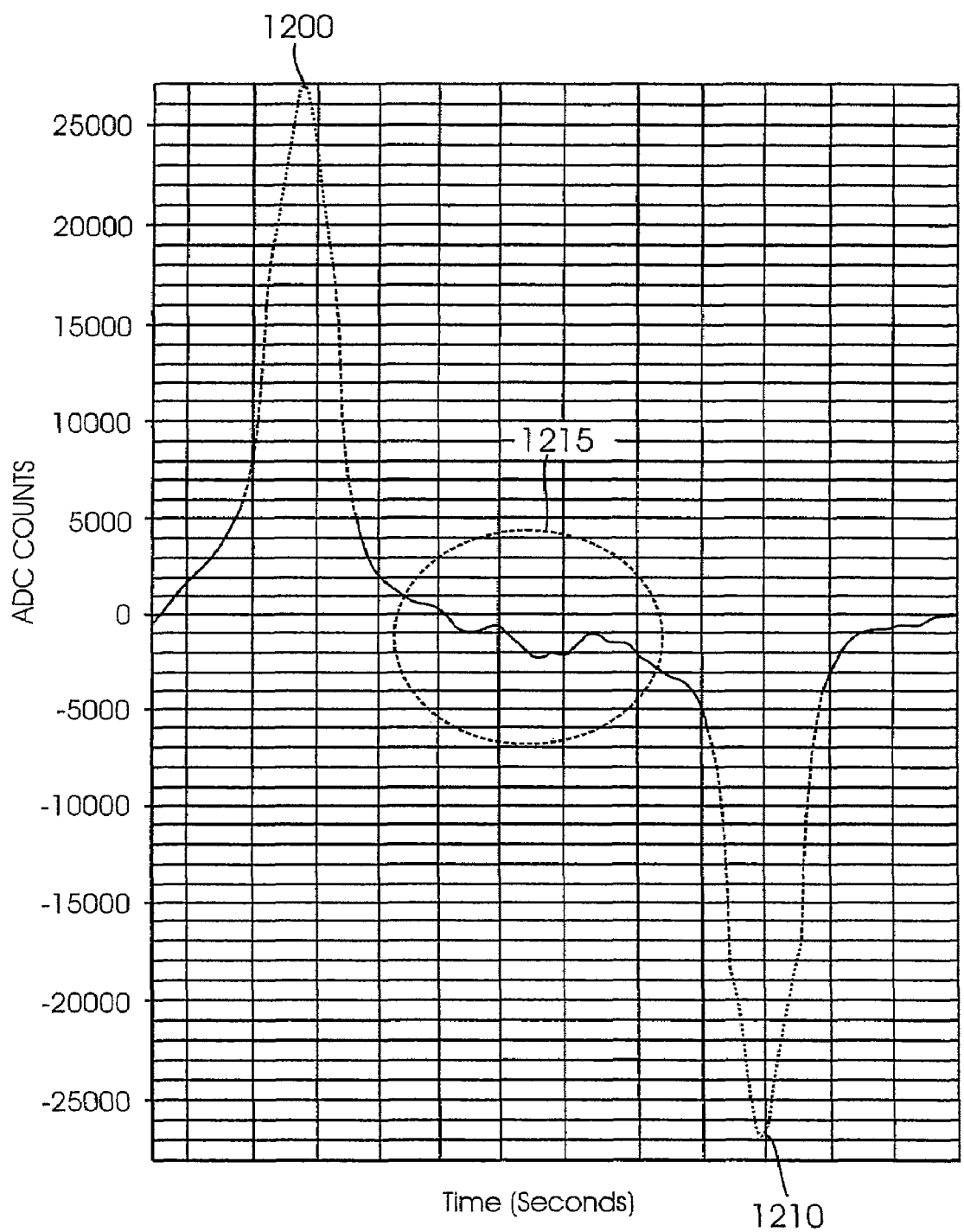
FIG. 12 illustrates a graphical representation of digitized signal produced by the ADC of FIG. 11A.

FIG. 12 illustrates a graphical representation of the compressed and digitized signal produced by the ADC of FIG. 11A. The vertical axis represents ADC counts and the horizontal axis represents the time in seconds. A positive peak 1200 reaches the ADC count of 27000 and a negative peak 1210 reaches the negative peak of −27000. The remanent noise component of the analog signal 160 is generally expressed within the window 1215 having the digital values from −3000 to 1500 between the peaks 1200 and 1210. Even after the enhancement by the compressive amplifier 110 and digitization by the selectable ADC 115, the recorded data component and the remanent noise characteristic component are still linked to one another. For example, as shown by the digital samples in the window 1215, the digital samples corresponding to the remanent noise characteristic component ride on the slope of the heavily influential recorded data component, so that the digital signal exhibits various levels of fluctuation throughout the window 1215.

As illustrated in FIG. 12, the digital samples in the region 1215 are tightly spaced without any visible gaps, such that the digital signal in the region 1215 substantially resembles the analog signal within the region 820 of FIG. 8. The digital signal within the region 1215 of FIG. 12 shows virtually the same fluctuations in the amplitudes as the analog signal in the region 820.

The filter 130 of FIG. 1 receives the digital signal from the selectable ADC 115, bit duration data and peak location information from the DEU 125. The filter 130 forwards the filtered signal to the authentication extraction unit 135. In some embodiments, the filter 130 is configured as a high pass filter, such that the low frequency, data dependent signal (also referred to as the recorded data signal) is substantially filtered out and the high frequency remanent noise characteristic signal remains in the digitized samples.

Figure 13:
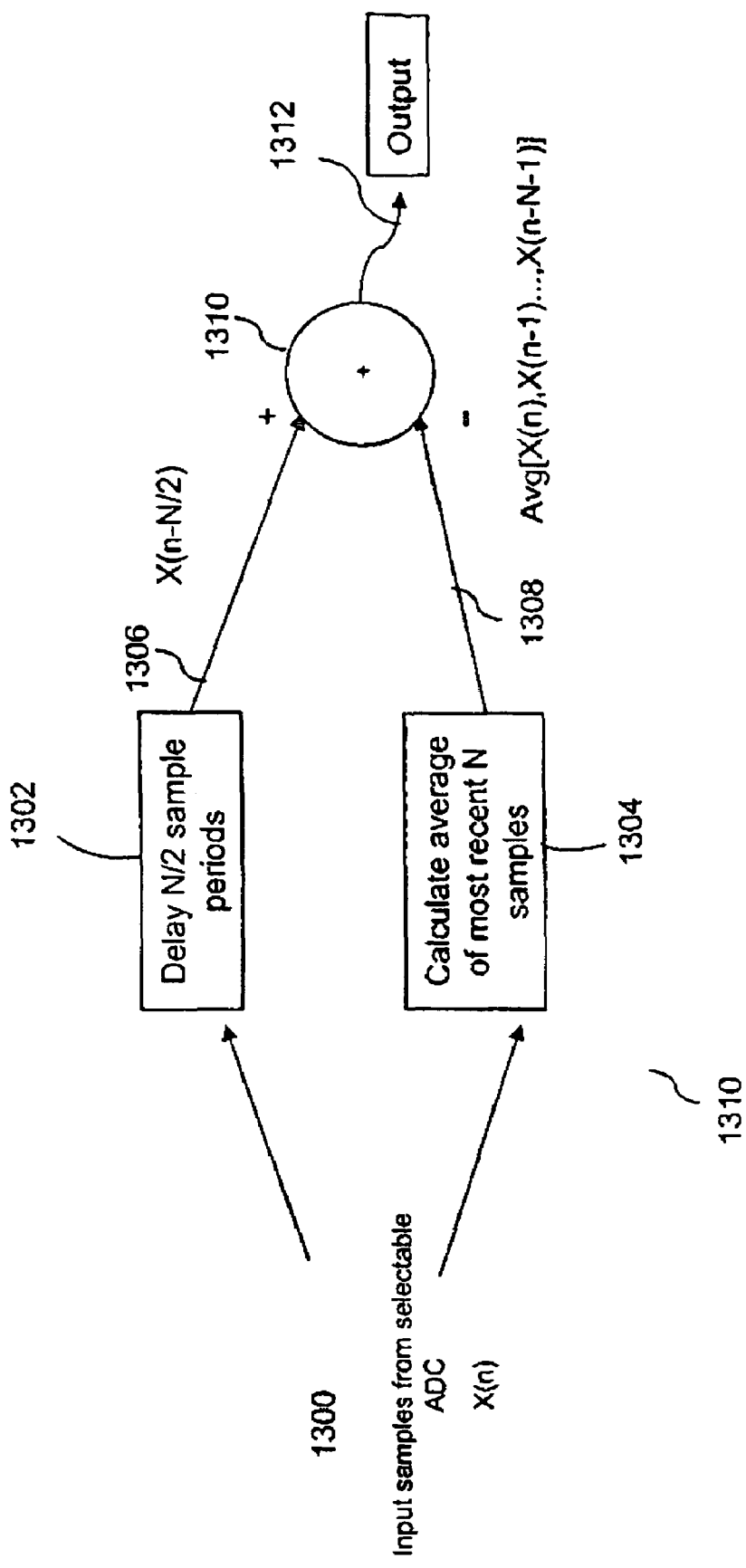
FIG. 13 is a signal flow diagram illustrating the processing flow for a filter constructed in accordance with aspects of the invention.

In one embodiment, as shown in FIG. 13, the filter 130 comprises a mean-smoothing filter. Referring to FIG. 13, input samples X(n), denoted as 1300, are the digital samples produced by the selectable ADC 115 of FIG. 1. The input samples 1300 are forwarded to two processing units 1302 and 1304. The first processing unit 1302 delays each sample X(n) by N/2 and the second processing unit 1034 calculates a sliding average of the N samples X(n). The respective outputs 1306 and 1308 are combined by a subtractor 1310, which in turn generates filtered output samples 1312.

Figure 14:
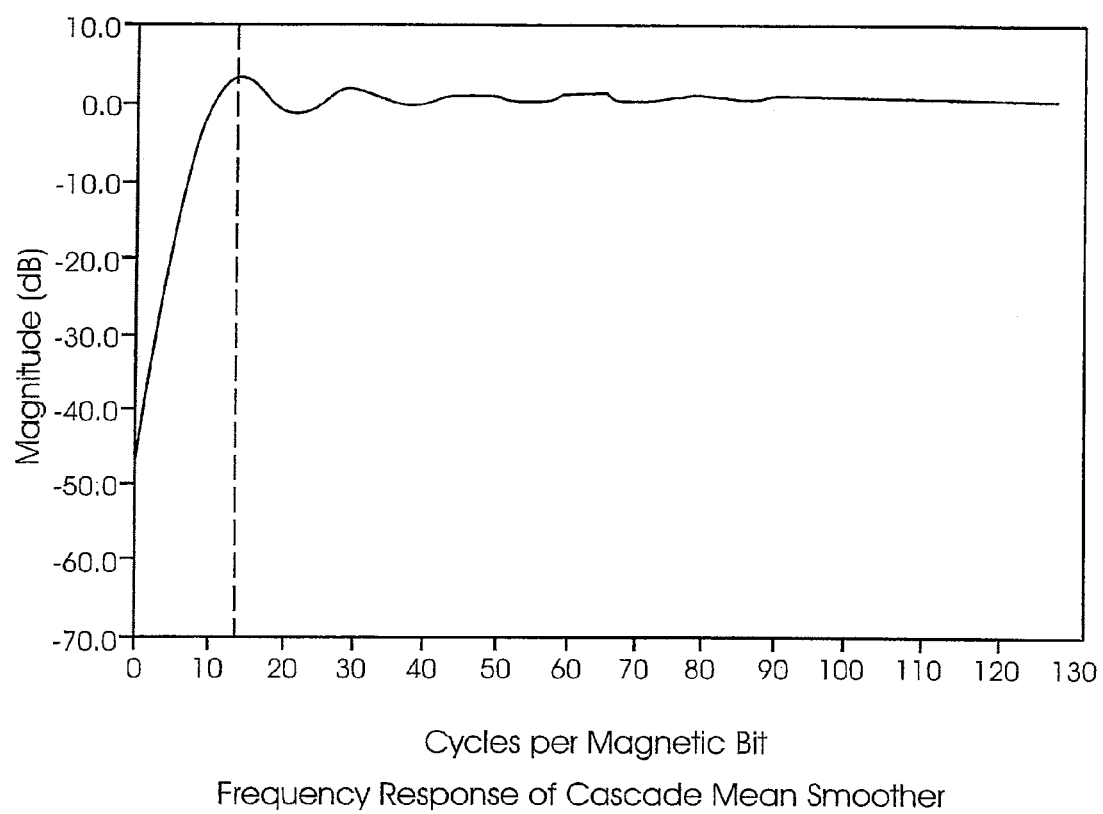
FIG. 14 depicts the frequency response of a plurality of filters of FIG. 13 cascaded in accordance with aspects of the invention.

In one embodiment, a single filter 1310 is used to process the digital samples X(n) 1300. In some other embodiments, a cascade of filters 1310 are used to process the digital samples X(n) 1300. FIG. 14 illustrates the frequency response of a cascade of two mean smoothing filters, each of which is substantially similar to the filter of FIG. 13. In some embodiments, the filter length, which determines the frequency response of the filter, is adjustable based on the swipe speed. In one embodiment, the filter length is calculated at the end of each magnetic bit's traversal of the sensing unit and the length of the filter is set to be ⅛ of the length of the most recent magnetic bit. In some embodiments, if a cascade of two filters is used, the length of each filter is set to be an odd number so that the length of the cascaded filter is an even number.

Still referring to FIG. 14, the vertical axis of the frequency response is the magnitude in units of dB, and the horizontal axis is the spatial frequency in units of cycles per magnetic bit. In FIG. 14, the frequency response indicates a high pass filter, where the magnitude components at low frequencies (in units of cycles per magnetic bit) are greatly attenuated.

Figure 15:
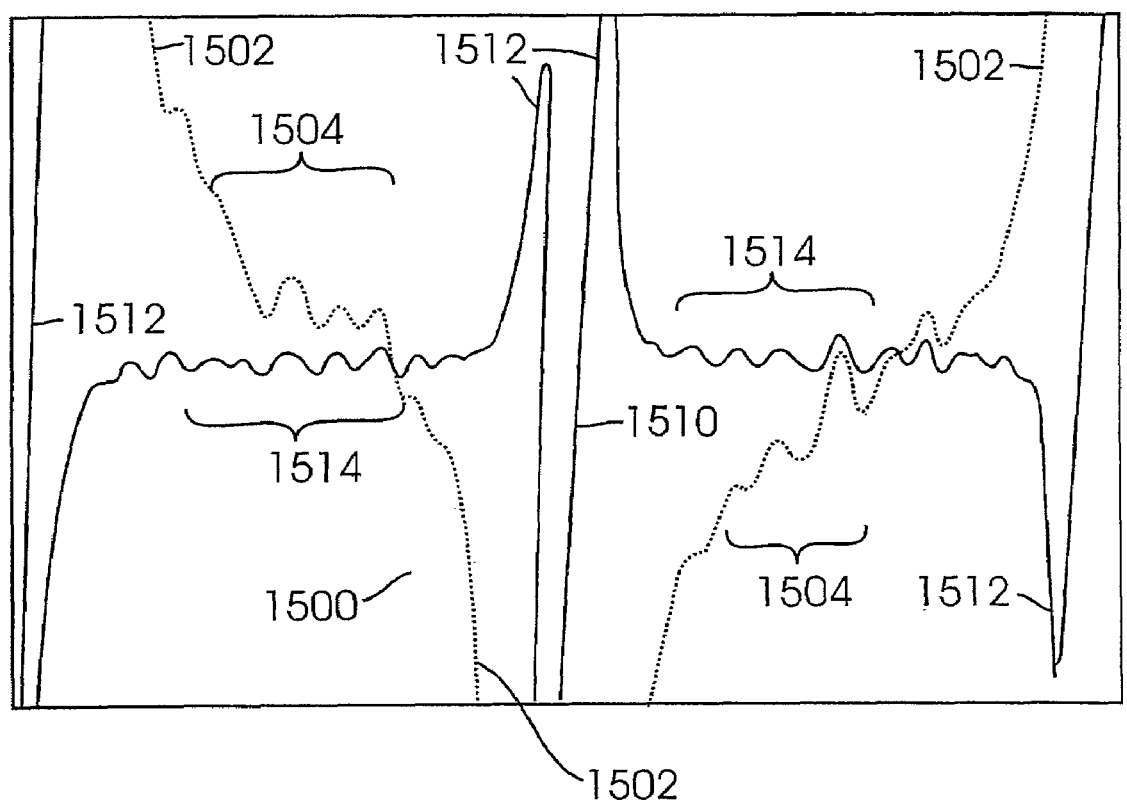
FIG. 15 illustrates plots comparing an unfiltered signal with a filtered signal filtered by the filter of FIG. 13.

FIG. 15 illustrates a comparison between filtered and unfiltered digital samples. The dashed plot 1500 represents the unfiltered signal. The solid plot 1510 represents the filtered signal. As can be seen by the dashed plot 1500 (as well as FIG. 12), the portion of interest 1504 between peaks of the signal is heavily dominated by data signal/peaks 1502. Due to the heavily influential recorded data dependent signal with significantly higher amplitudes, the signal in the portion 1504 fluctuates along with the data dependent component of the signal, dominating over the relatively flat lower amplitude remanent noise signal.

However, when the signal is processed by the filters of FIGS. 13 and 14, a much flatter central portion 1514 results between the peaks 1512 of the filtered signal 1510. The influence of the recorded data on the central portions 1514 of the signal is substantially negated, thus the portion 1514 representing the remanent noise characteristic can be easily distinguished from the peaks 1512. In some other embodiments, an analog filter or a cascade of analog filters maybe used to isolate the remanent noise characteristic component of the amplified analog signal 165 from the recorded data component of the amplified analog signal 165.

Figure 16:
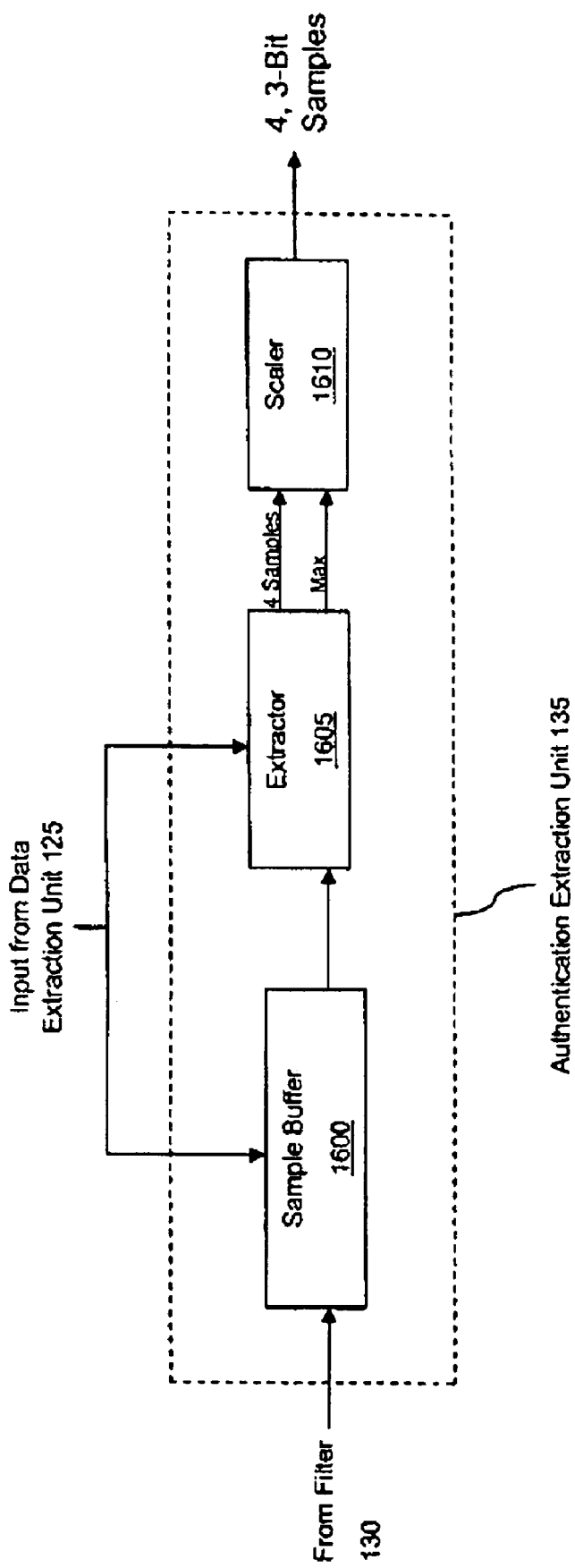
FIG. 16 illustrates an embodiment of the authentication extraction unit of FIG. 1 in accordance with aspects of the invention.

FIG. 16 illustrates an embodiment of the authentication extraction unit (AEU) 135 of FIG. 1 in accordance with aspects of the invention. The AEU 135 identifies the magnetic zeros to use to capture the remanent magnetic characteristics of the magnetic stripe 155 (FIG. 1). The AEU also communicates with the DEU 125 to receive the bit duration and peak location information, which is also provided to the controller 120 and the filter 130 by the DEU 125.

In the embodiment of FIG. 16, the AEU comprises a sample buffer 1600, an extractor 1605, and a scaler 1610. The sample buffer stores amplified and filtered digital samples of a magnetic bit as the magnetic stripe 155 (FIG. 1) containing the magnetic bit is passing through the sensing unit 105 (FIG. 1). T0 denotes the duration of the most recent bit (Nth bit) that had already passed by the sensing unit 105 (FIG. 1). Thus T0, which is provided by the DEU 125 of FIG. 1, denotes the time for the entire Nth magnetic bit to pass by the sensing unit 105. At the end of the Nth bit, the buffer waits for the duration of ¼ of the previous bit duration (i.e., T0/4). Samples are collected into the sample buffer 1600 for the N+1st bit from the time T0/4 until the last peak is detected at the end of T1 (denoting the duration of the N+1st bit) or the buffer is full, whichever occurs first. The size of the buffer 1600 should be large enough to hold the desired number of samples to accurately represent the remanent noise characteristic among the collected samples.

The AEU of FIG. 16 also comprises an extractor 1605. The extractor 1605 receives information regarding bit duration (e.g., the duration of the N+1th magnetic bit as T1) and potential peak locations from the DEU 125 of FIG. 1. The DEU 125 merely indicates to the AEU 135 all of the potential peaks, not knowing for certain which one of the potential peaks detected by the DEU 125 is an actual peak. The peak detection algorithm ensures that the last potential peak declared is the actual peak. For example, the peak detection algorithm indicates a local maximum as a potential peak. The algorithm then searches for a potential peak with a higher value than the previous potential peaks and the subsequent potential peaks. Thus the global maximum from the local maxima is identified as the actual peak. Once the actual peaks are determined, the extractor determines which of the samples in the buffer 1600 are located closest to the desired points in the magnetic bit and therefore best represent the remanent noise characteristic. Referring back to FIG. 15, the samples best representing the remanent noise characteristic are extracted from the middle of the magnetic bit in region 1514 (post-filtered).

In an instance where more than one sample is to be extracted, the selected sample locations should be symmetric about the center of the magnetic bit so that they may be obtained regardless of the direction of the swipe. Because only a limited number of samples can be transmitted, (and hence, captured) due to the data/sample size restrictions imposed by banks, the spacing of the samples to be extracted should be sufficient to be statistically independent and therefore maximize their entropy and promote effective discrimination of fraudulent magstripes. If the samples are taken too close together, less information about the magstripe is garnered and inferior discrimination results.

In one example, samples representing the remanent noise characteristic are taken from 32 magnetic zeros and are collected by the sample buffer 1600. For each group of samples collected from the 32 magnetic zeros, four samples are to be extracted and provided as an authenticity identifier for the card 150 of FIG. 1. The four samples extracted are the ones closest to (13/32)T1, (15/32)T1, (17/32)T1, and (19/32)T1 points, where T1 denotes the time the current magnetic bit passes through the sensing unit 105 of FIG. 1. For example, if a total of 400 samples are collected by the buffer 1600, the first extracted sample was collected at (13/32)*400=the 162nd sample, second extracted sample was collected at (15/32)*400=the 187th sample, the third extracted sample was collected at the 212th sample and the 4th extracted sample was collected at the 237th sample. The Extractor 1604 passes along the four extracted samples as well as the maximum amplitude of all the samples between (13/32)T1 and (19/32)T1 to the scaler 1610.

In one embodiment, the scaler 1610 scales each extracted sample having a 17 bit data value down to a 3-bit data value. More specifically, in this embodiment, the selectable ADC 115 outputs samples of a magnetic bit, where each sample representing the magnetic bit is comprised of 17 data bits. The four 17-bit samples extracted by the Extractor 1605 are then scaled down to four 3-bit data samples. Thus, four 3-bit samples are produced by the scaler 1610 for each of the 32 magnetic zero bits that form the authenticity identifier. In this embodiment, the total size of the authenticity identifier is 384 bits or 48 bytes (32 magnetic zeros each having 4 3-bit samples).

Figure 17:
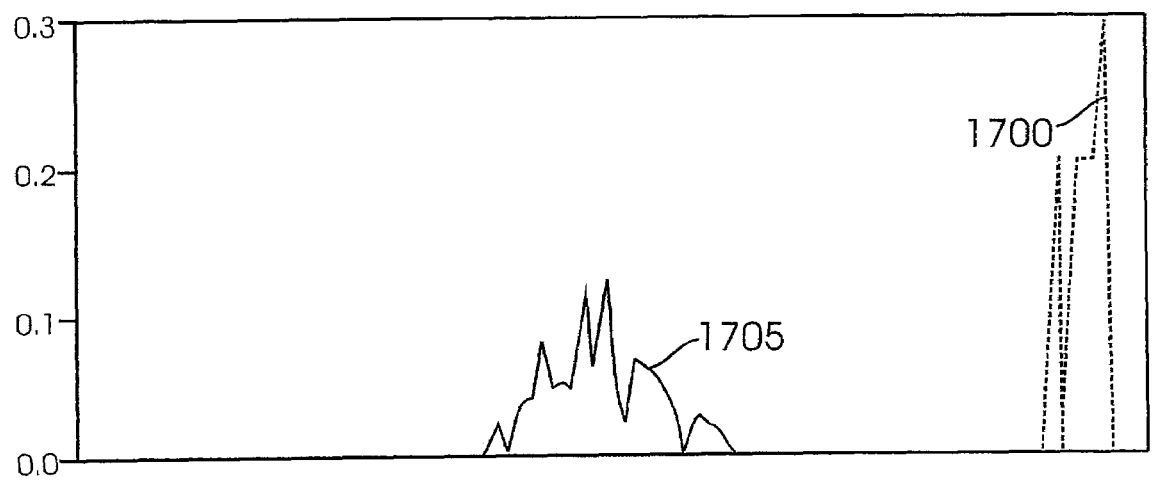
FIG. 17 is a correlation coefficient histogram comparing the distributions of correlations for authentic and forged cards.

As previously mentioned, the authenticity identifier samples produced by the AEU 135 are encrypted by the encryption unit 145 and the card data samples produced by the DEU 125 are concatenated by the data combiner 140 with the encrypted authenticity identifier of the reader system 100. FIG. 17 illustrates a correlation coefficient histogram of authentic cards and forged cards after processing magstripes of both cards through the reader system 100 of FIG. 1. Dashed lines 1700 represent the correlation coefficients of authentic cards. The solid lines 1705 represent the correlation coefficients of forged cards. As illustrated in FIG. 17, no overlap exists between the authentic card and the forged card distributions because their respective correlation coefficients derived from the remanent noise characteristics are substantially different from each other. Because of the substantial differences between the remanent noise characteristics of the authentic cards and the forged cards, the forgery is easily and reliably detected.

Variations, modifications, and other implementations of what is described herein will occur to those of ordinary skill in the art without departing from the spirit and the scope of the invention as claimed. Although the invention has been described with respect to certain embodiments, it should be recognized that the invention includes the claims and their equivalents supported by this disclosure.

What is claimed is:

1. A reader system for authenticating an object, the object comprising a magnetic medium possessing a remanent noise characteristic component and recorded data component, the reader system configured to read the object when the object is moved in proximity to the reader system at a velocity, the reader system comprising:
   a sensing unit configured to generate a signal indicative of the magnetic field of the magnetic medium;
   an analog-to-digital converter (ADC) in communication with the sensing unit and configured to digitize the signal indicative of the magnetic field of the magnetic medium;
   a filter, in communication with the ADC, configured to filter out the recorded data component of the digitized signal and configured to preserve the remanent noise characteristic component of the digitized signal;
   a data extraction unit, in communication with the ADC and the filter, configured to measure at least bit duration and peak location; and
   an authentication extraction unit, in communication with the filter and the data extraction unit, and configured to extract a set of scaled samples from the output of the filter representative of the remanent noise characteristic.

2. The reader system of claim 1, wherein the filter comprises a high pass filter.

3. The reader system of claim 2, wherein the high pass filter comprises a mean smoothing filter.

4. The reader system of claim 3, wherein the high pass filter comprises a cascade of mean smoothing filters.

5. The reader system of claim 1 wherein the authentication extraction unit comprises:
   a sample buffer,
   an extractor, and
   a scaler,
   wherein the sample buffer is configured to store samples of the digitized signal,
   wherein the extractor is configured to extract a set of samples representative of the remanent noise characteristic, and
   wherein the scaler is configured to scale the extracted set of samples to a specified data word size.

6. The reader system of claim 1 wherein the object comprises a magnetic stripe bearing card.

7. The reader system of claim 6, wherein the magnetic stripe bearing card is swiped through the reader system at the velocity.

8. The reader system of claim 1, wherein the filter comprises an over-sampled modulator configured to sample the digitized signal indicative of the magnetic field of the magnetic medium at a frequency higher than the Nyquist rate.

9. The reader system of claim 1, wherein the filter comprises at least one of a sinc filter, a decimator, a half band filter, an up-sampler, and a low pass filter.

10. The reader system of claim 1, wherein a frequency response of the filter is dependent on the velocity.

11. A method of authenticating an object, the object comprising a magnetic medium including a remanent noise characteristic portion and a recorded data portion, the method comprising:
    generating a signal indicative of the magnetic field of the magnetic medium in response to the object being moved at a velocity;
    digitizing the signal indicative of the magnetic field of the magnetic medium;
    filtering out the recorded data portion of the digitized signal recorded data;
    preserving the remanent noise characteristic portion of the digitized signal; and
    extracting a set of samples representative of the remanent noise characteristic.

12. The method of claim 11, wherein the filtering and the preserving is performed using a high pass filter.

13. The method of claim 12, wherein the high pass filter is a mean smoothing filter.

14. The method of claim 11, wherein the filtering and the preserving is performed using a cascade of high pass filters.

15. The method of claim 14, wherein the cascade includes a plurality of mean smoothing filters.

16. The method of claim 11, wherein extracting a set of samples representative of the remanent noise characteristic comprises scaling the set of samples to a specified data word size.

17. The method of claim 11, wherein the filtering and the preserving comprise sampling the digitized signal indicative of the magnetic field of the magnetic medium at a frequency higher than the Nyquist rate.

18. The method of claim 11, wherein a frequency response relating to the filtering and the preserving is dependent on the velocity of the object.

19. The method of claim 11, wherein the object comprises a magnetic stripe bearing card.

20. The method of claim 19, further comprising swiping the magnetic stripe bearing card through a reader system at the velocity.

* * * * *